US012742865B2

(12) United States Patent
Rangarajan et al.

(10) Patent No.: US 12,742,865 B2
(45) Date of Patent: Sep. 22, 2026

(54) OPTICAL POWER MONITORING IN LIDAR SYSTEMS AND DEVICES

(71) Applicant: VELODYNE LIDAR USA, INC., San Jose, CA (US)

(72) Inventors: Suresh Rangarajan, Pleasanton, CA (US); Oren Milgrome, San Jose, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 960 days.

(21) Appl. No.: 18/076,119

(22) Filed: Dec. 6, 2022

(65) Prior Publication Data

US 2024/0183957 A1 Jun. 6, 2024

(51) Int. Cl.
*G01S 7/497* (2006.01)
*G01J 1/44* (2006.01)

(52) U.S. Cl.
CPC ................ *G01S 7/497* (2013.01); *G01J 1/44* (2013.01); *G01J 2001/446* (2013.01); *G01S 2007/4975* (2013.01)

(58) Field of Classification Search
CPC ..... G01S 7/497; G01S 2007/4975; G01J 1/44
See application file for complete search history.

(56) References Cited

U.S. PATENT DOCUMENTS

| | | | | |
|---|---|---|---|---|
| 6,512,575 | B1 * | 1/2003 | Marchi | G01S 7/497 356/5.1 |
| 10,107,899 | B1 * | 10/2018 | Han | G01S 17/42 |
| 2002/0131034 | A1 * | 9/2002 | Chien | G01S 7/484 356/5.01 |
| 2011/0286009 | A1 * | 11/2011 | Lohmann | G01S 7/4813 356/614 |
| 2017/0090019 | A1 * | 3/2017 | Slobodyanyuk | G01S 17/10 |
| 2020/0284887 | A1 * | 9/2020 | Wachter | G01S 7/4817 |

* cited by examiner

*Primary Examiner* — Eric L Bolda
(74) *Attorney, Agent, or Firm* — Kilpatrick Townsend & Stockton LLP

(57) ABSTRACT

The subject matter of this disclosure relates to a system, a method, and an apparatus for power monitoring and blockage detection in a lidar device. An example method includes: emitting, by a transmitter of a lidar device, an optical signal toward a maintenance area that is inside the lidar device and outside a field of view for the lidar device; measuring, by a power monitoring circuit of the lidar device, an intensity of an incident signal corresponding to the optical signal; comparing the measured intensity with a target intensity value; and adjusting, based on the comparison, an electrical control signal provided to the transmitter.

20 Claims, 19 Drawing Sheets

OPTICAL POWER MONITORING IN LIDAR SYSTEMS AND DEVICES

FIELD OF TECHNOLOGY

The present disclosure relates generally to lidar technology and, more specifically, to monitoring and controlling optical signal intensity and detecting blockages associated with lidar devices.

BACKGROUND

Lidar (light detection and ranging) systems measure the attributes of their surrounding environments (e.g., shape of a target, contour of a target, distance to a target, etc.) by illuminating the environment with light (e.g., laser light) and measuring the reflected light with sensors. Differences in laser return times and/or wavelengths can then be used to make digital, three-dimensional ("3D") representations of a surrounding environment. Lidar technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), etc. Depending on the application and associated field of view, multiple optical transmitters and/or optical receivers may be used to produce images in a desired resolution. A lidar system with greater numbers of transmitters and/or receivers can generally generate larger numbers of pixels.

In a multi-channel lidar device, optical transmitters can be paired with optical receivers to form multiple "channels." In operation, each channel's transmitter can emit an optical signal (e.g., laser light) into the device's environment, and the channel's receiver can detect the portion of the signal that is reflected back to the channel's receiver by the surrounding environment. In this way, each channel can provide "point" measurements of the environment, which can be aggregated with the point measurements provided by the other channel(s) to form a "point cloud" of measurements of the environment.

The measurements collected by a lidar channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal(s) reflected by the surface.

In some cases, lidar measurements may be used to determine the reflectance of the surface that reflects an optical signal. The reflectance of a surface may be determined based on the intensity of the return signal, which generally depends not only on the reflectance of the surface but also on the range to the surface, the emitted signal's glancing angle with respect to the surface, the power level of the channel's transmitter, the alignment of the channel's transmitter and receiver, and other factors.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein are systems and methods for power monitoring and blockage detection in a lidar device. In one aspect, the subject matter described herein relates to a lidar power monitoring method. The method includes emitting, by a transmitter of a lidar device, an optical signal toward a maintenance area that is inside the lidar device and outside a field of view for the lidar device. The method includes measuring, by a power monitoring circuit of the lidar device, an intensity of an incident signal corresponding to the optical signal. The method includes comparing the measured intensity with a target intensity value. The method includes adjusting, based on the comparison, an electrical control signal provided to the transmitter.

In another aspect, the subject matter described herein relates to a lidar system. The lidar system includes a lidar device. The lidar device includes a transmitter configured to emit optical signals. The lidar device includes a power monitoring circuit configured to monitor intensities associated with the optical signals. The lidar device includes a maintenance area located inside the lidar device and outside a field of view for the lidar device. The lidar system includes at least one processor. The transmitter is configured to emit an optical signal toward the maintenance area. The power monitoring circuit is configured to measure an intensity of an incident signal corresponding to the optical signal. The at least one processor is programmed to perform operations including: comparing the measured intensity with a target intensity value, and adjusting, based on the comparison, an electrical control signal provided to the transmitter.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
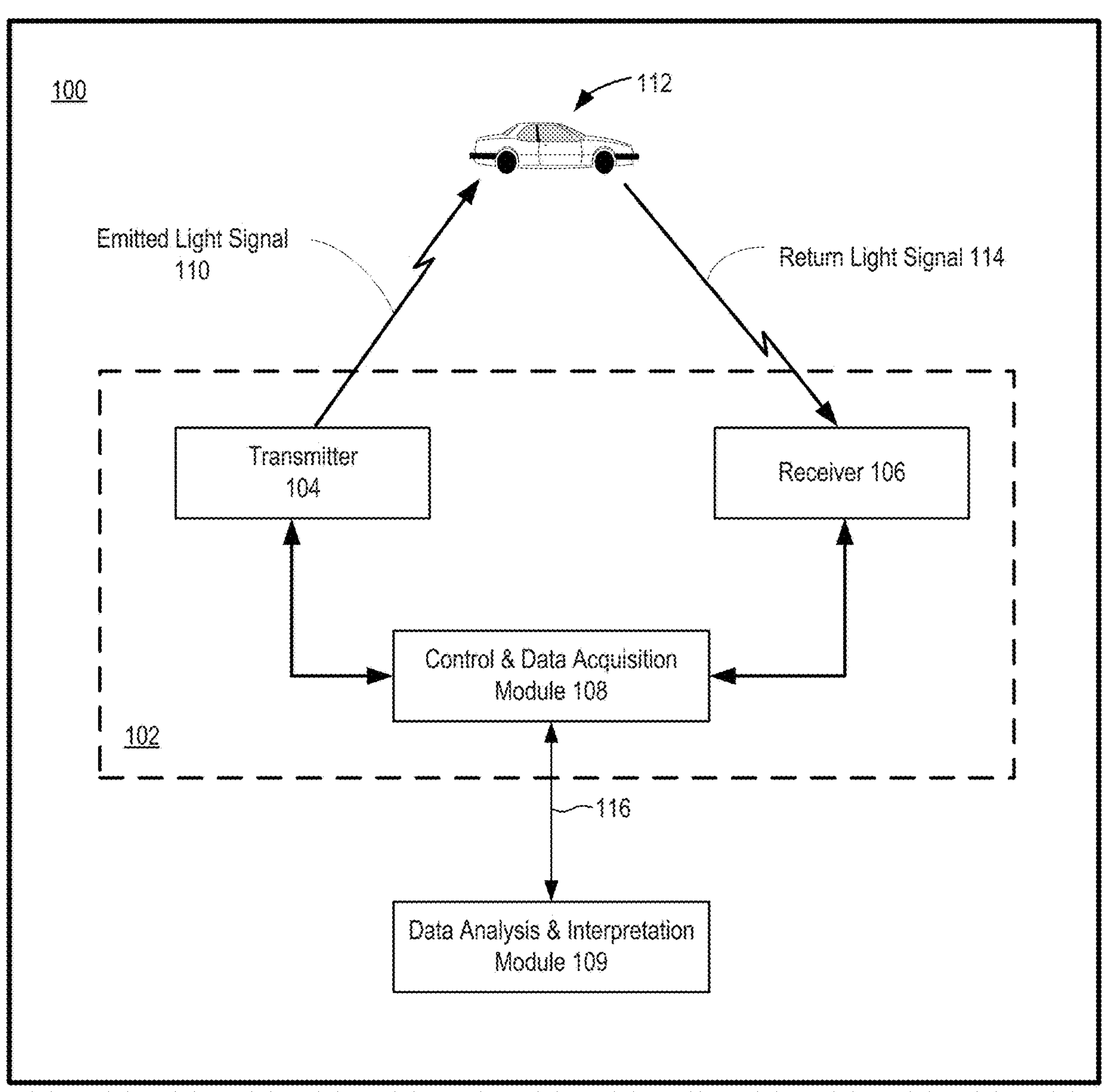
FIG. 1 is an illustration of an exemplary lidar system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Systems and methods for monitoring optical power levels and detecting blockages at a lidar device are disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Three of the most significant technical challenges faced by the lidar industry are (1) reducing the manufacturing cost for lidar devices while maintaining existing performance levels, (2) improving the reliability of lidar devices under automotive operating conditions (e.g., weather, temperature, and mechanical vibration), and (3) increasing the range of lidar devices. One approach to reducing manufacturing costs is to reduce the amount of hardware (e.g., channels, transmitters, emitters, receivers, detectors, etc.) in the lidar device while increasing the utilization of the remaining hardware to maintain performance levels. One approach to improving device reliability is to develop lidar devices that use fewer moving mechanical parts (e.g., by eliminating or simplifying mechanical beam scanners). One approach to extending range is to develop lidar devices that use solid-state lasers.

In certain examples, an “operating mode” can refer to a power level for one or more transmitters or channels in a lidar device. Each operating mode can be associated with a respective amount of power applied to the transmitters or channels, such that the intensities of emitted optical signals can correspond to the operating mode and/or can be adjusted by changing the operating mode. For example, a lidar device can have a high operating mode corresponding to high power or high intensity, and a low operating mode corresponding to low power or low intensity.

In certain examples, a “maintenance area” can refer to a region that is inside a lidar device and outside a field of view (FOV) for the device. The maintenance area can be used to take “reference measurements” or to measure a “reference intensity,” as described herein. Such measurements can be performed by aiming a transmitter toward the maintenance area and taking an intensity reading (e.g., using a power monitoring circuit), as described herein.

In certain examples, a “reference intensity” can refer to an intensity associated with an optical signal emitted by a transmitter toward a maintenance area. The reference intensity can be measured using a power monitoring circuit, as described herein. A “reference measurement” can refer to a measurement of the reference intensity.

In certain examples, a “scanning area” can refer to a region of a surrounding environment that is being scanned by a lidar device. The scanning area can correspond to a field of view for the lidar device. The scanning area can be or include, for example, a city environment, a highway environment, an interior of a building, etc.

In certain examples, a “target intensity” can refer to a desired intensity value or a setpoint intensity value for a channel or transmitter of a lidar device. For example, when the intensities of optical signals emitted by a transmitter change or drift over time (e.g., as detected by a power monitoring circuit), the transmitter (or a power or current applied to the transmitter) can be adjusted to make the optical signal intensity equal to the target intensity, as described herein.

Motivation for Some Embodiments

In various instances, the intensities of optical signals emitted by the transmitters of a lidar device may change or drift over time, for example, due to repeated use (e.g., equipment degradation), external temperature changes, etc.

Such variations in the optical signals can reduce measurement accuracy of the lidar device. Existing approaches for monitoring and/or adjusting emitted optical signal intensities are generally inaccurate, time consuming and expensive, and may require manufacturer intervention.

Advantageously, in certain examples, the systems and methods described herein utilize a power monitoring circuit in a lidar device that provides accurate measurements of the intensities of emitted optical signals. The power monitoring circuit allows the optical signal intensity to be monitored and adjusted, as needed, to maintain consistent or desired intensities over time. For example, when the power monitoring circuit detects a change in optical signal intensity for a transmitter, an amount of power provided to the transmitter can be adjusted (e.g., using iterative techniques or process control techniques) to achieve a target intensity for the transmitter.

Further, in some instances, a blockage (e.g., dirt, a leaf, a dead bug, etc.) may appear on a window of a lidar device. Such blockages can prevent the lidar device from being able to view portions of the environment that are covered by the blockages. Existing blockage detection methods for lidar devices are generally inaccurate.

Advantageously, in certain examples, the systems and methods described herein utilize the power monitoring circuit to detect the presence of blockages. The power monitoring circuit can measure a first intensity (alternatively referred to herein as a "reference intensity") when an optical signal is directed toward a maintenance area in the device. The power monitoring circuit can measure a second intensity when an optical signal is directed toward or through the window of the lidar device. Based on a comparison of the two measured intensities, the lidar device (or associated computer components) can detect the presence of a blockage on the window. Compared to previous approaches, the systems and methods described herein for detecting blockages are more accurate and reliable.

Some Examples of Lidar Systems

A lidar system may be used to measure the shape and contour of the environment surrounding the system. Lidar systems may be applied to numerous applications including autonomous navigation and aerial mapping of surfaces. In general, a lidar system emits light that is subsequently reflected by objects within the environment in which the system operates. The light may be emitted by a laser (e.g., a rapidly firing laser). Laser light travels through a medium and reflects off points of surfaces in the environment (e.g., surfaces of buildings, tree branches, vehicles, etc.). The reflected (and/or scattered) light energy returns to a lidar detector where it may be sensed and used to perceive the environment.

The science of lidar systems is based on the physics of light and optics. Any suitable measurement techniques may be used to determine the attributes of objects in a lidar system's environment. In some examples, the lidar system is configured to emit light pulses (e.g., individual pulses or sequences of pulses). The time each pulse (or pulse sequence) travels from being emitted to being received ("time of flight" or "TOF") may be measured to determine the distance between the lidar system and the object that reflects the pulse. Lidar systems that operate in this way may be referred to as "pulsed lidar," "TOF lidar," "direct TOF lidar," or "pulsed TOF lidar." In some other examples, the time of flight may be calculated indirectly (e.g., using amplitude-modulated continuous wave (AMCW) structured light). Lidar systems that operate in this way may be referred to as "indirect TOF lidar" or "iTOF lidar." In still other examples, the lidar system can be configured to emit continuous wave (CW) light. The wavelength (or frequency) of the received, reflected light may be measured to determine the distance between the lidar system and the object that reflects the light. In some examples, lidar systems can measure the speed (or velocity) of objects. Lidar systems that operate in this way may be referred to as "coherent lidar," "continuous wave lidar," or "CW lidar." In a CW lidar system, any suitable variant of CW lidar sensing may be used. For example, frequency modulated continuous wave (FMCW) lidar sensing may be used.

FIG. 1 depicts the operation of a lidar system 100, according to some embodiments. In the example of FIG. 1, the lidar system 100 includes a lidar device 102, which may include a transmitter 104 that generates and emits a light signal 110, a receiver 106 that detects and processes a return light signal 114, and a control & data acquisition module 108. The transmitter 104 may include a light source (e.g., "optical emitter" or "emitter"), electrical components operable to activate (e.g., drive) and deactivate the light source in response to electrical control signals, and optical components adapted to shape and redirect the light emitted by the light source. The receiver 106 may include a light detector (e.g., "optical detector," "photodetector," or "detector") and optical components adapted to shape return light signals 114 and direct those signals to the detector. In some implementations, one or more optical components (e.g., lenses, mirrors, etc.) may be shared by the transmitter and the receiver.

The lidar device 102 may be referred to as a lidar transceiver or "channel." In operation, the emitted light signal 110 propagates through a medium and reflects off an object(s) 112, whereby a return light signal 114 propagates through the medium and is received by receiver 106. In one example, each lidar channel may correspond to a physical mapping of a single emitter to a single detector (e.g., a one-to-one pairing of a particular emitter and a particular detector). In other examples, however, each lidar channel may correspond to a physical mapping of multiple emitters to a single detector or a physical mapping of a single emitter to multiple detectors (e.g., a "flash" configuration). In some examples, a lidar system 100 may have no fixed channels; rather, light emitted by one or more emitters may be detected by one or more detectors without any physical or persistent mapping of specific emitters to specific detectors.

Any suitable light source may be used including, without limitation, one or more gas lasers, chemical lasers, metal-vapor lasers, solid-state lasers (SSLs) (e.g., Q-switched SSLs, Q-switched solid-state bulk lasers, etc.), fiber lasers (e.g., Q-switched fiber lasers), liquid lasers (e.g., dye lasers), semiconductor lasers (e.g., laser diodes, edge emitting lasers (EELs), vertical-cavity surface emitting lasers (VCSELs), quantum cascade lasers, quantum dot lasers, quantum well lasers, hybrid silicon lasers, optically pumped semiconductor lasers, etc.), and/or any other device operable to emit light. For semiconductor lasers, any suitable gain medium may be used including, without limitation, gallium nitride (GaN), indium gallium nitride (InGaN), aluminum gallium indium phosphide (AlGaInP), aluminum gallium arsenide (AlGaAs), indium gallium arsenide phosphide (InGaAsP), lead salt, etc. For Q-switched lasers, any suitable type or variant of Q-switching can be used including, without limitation, active Q-switching, passive Q-switching, cavity dumping, regenerative Q-switching, etc. The light source may emit light having any suitable wavelength or wavelengths, including but not limited to wavelengths between 100 nm (or less) and 1 mm (or more). Semiconductor lasers operable to emit light having wavelengths of approximately 905 nm, 1300 nm, or 1550 nm are widely commercially available. In some examples, the light source may be operated as a pulsed laser, a continuous-wave (CW) laser, and/or a coherent laser. A light signal (e.g., "optical signal") 110 emitted by a light source may consist of a single pulse, may include a sequence of two or more pulses, or may be a continuous wave.

A lidar system 100 may use any suitable illumination technique to illuminate the system's field of view (FOV). In some examples, the lidar system 100 may illuminate the entire FOV simultaneously. Such illumination techniques may be referred to herein as "flood illumination" or "flash illumination." In some examples, the lidar system 100 may illuminate fixed, discrete spots throughout the FOV simultaneously. Such illumination techniques may be referred to herein as "fixed spot illumination." In some examples, the lidar system 100 may illuminate a line within the FOV and use a scanner (e.g., a 1D scanner) to scan the line over the entire FOV. Such illumination techniques may be referred to herein as "scanned line illumination." In some examples, the lidar system 100 may simultaneously illuminate one or more spots within the FOV and use a scanner (e.g., a 1D or 2D scanner) to scan the spots over the entire FOV. Such illumination techniques may be referred to herein as "scanned spot illumination."

Any suitable optical detector may be used including, without limitation, one or more photodetectors, contact image sensors (CIS), solid-state photodetectors (e.g., photodiodes (PD), single-photon avalanche diode (SPADs), avalanche photodiodes (APDs), etc.), photomultipliers (e.g., silicon photomultipliers (SiPMs), and/or any other device operable to convert light (e.g., optical signals) into electrical signals. In some examples, CIS can be fabricated using a complementary metal-oxide semiconductor (CMOS) process. In some examples, solid-state photodetectors can be fabricated using semiconductor processes similar to CMOS. Such semiconductor processes may use silicon, germanium, indium gallium arsenide, lead (II) sulfide, mercury cadmium, telluride, MoS2, graphene, and/or any other suitable material(s). In some examples, an array of integrated or discrete CIS or solid-state photodetectors can be used to simultaneously image (e.g., perform optical detection across) the lidar device's entire field of view or a portion thereof. In general, solid-state photodetectors may be configured to detect light having wavelengths between 190 nm (or lower) and 1.4 μm (or higher). PDs and APDs configured to detect light having wavelengths of approximately 905 nm, 1300 nm, or 1550 nm are widely commercially available.

The lidar system 100 may include any suitable combination of measurement technique(s), light source(s), illumination technique(s), and detector(s). Some combinations may be more accurate or more economical on certain conditions. For example, some combinations may be more economical for short-range sensing but incapable of provide accurate measurements at longer ranges. Some combinations may pose potential hazards to eye safety, while other combinations may reduce such hazards to negligible levels.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 or the receiver 106 determines (e.g., measures) particular characteristics of the return light signal 114 detected by the receiver 106. For example, the control & data acquisition module 108 or receiver 106 may measure the intensity of the return light signal 114 using any suitable technique.

Operational parameters of the transceiver 102 may include its horizontal field of view ("FOV") and its vertical FOV. The FOV parameters effectively define the region of the environment that is visible to the specific lidar transceiver 102. More generally, the horizontal and vertical FOVs of a lidar system 100 may be defined by combining the fields of view of a plurality of lidar devices 102.

To obtain measurements of points in its environment and generate a point cloud based on those measurements, a lidar system 100 may scan its FOV. A lidar transceiver system 100 may include one or more beam-steering components (not shown) to redirect and shape the emitted light signals 110 and/or the return light signals 114. Any suitable beam-steering components may be used including, without limitation, mechanical beam steering components (e.g., rotating assemblies that physically rotate the transceiver(s) 102, rotating scan mirrors that deflect emitted light signals 110 and/or return light signals 114, etc.), optical beam steering components (e.g., lenses, lens arrays, microlenses, microlens arrays, beam splitters, etc.), microelectromechanical (MEMS) beam steering components (e.g., MEMS scan mirrors, etc.), solid-state beam steering components (e.g., optical phased arrays, optical frequency diversity arrays, etc.), etc.

In some implementations, the lidar system 100 may include or be communicatively coupled to a data analysis & interpretation module 109, which may receive outputs (e.g., via a connection 116) from the control & data acquisition module 108 and may perform data analysis on those outputs. By way of example and not limitation, connection 116 may be implemented using wired or wireless (e.g., non-contact communication) technique(s).

Figure 2A:
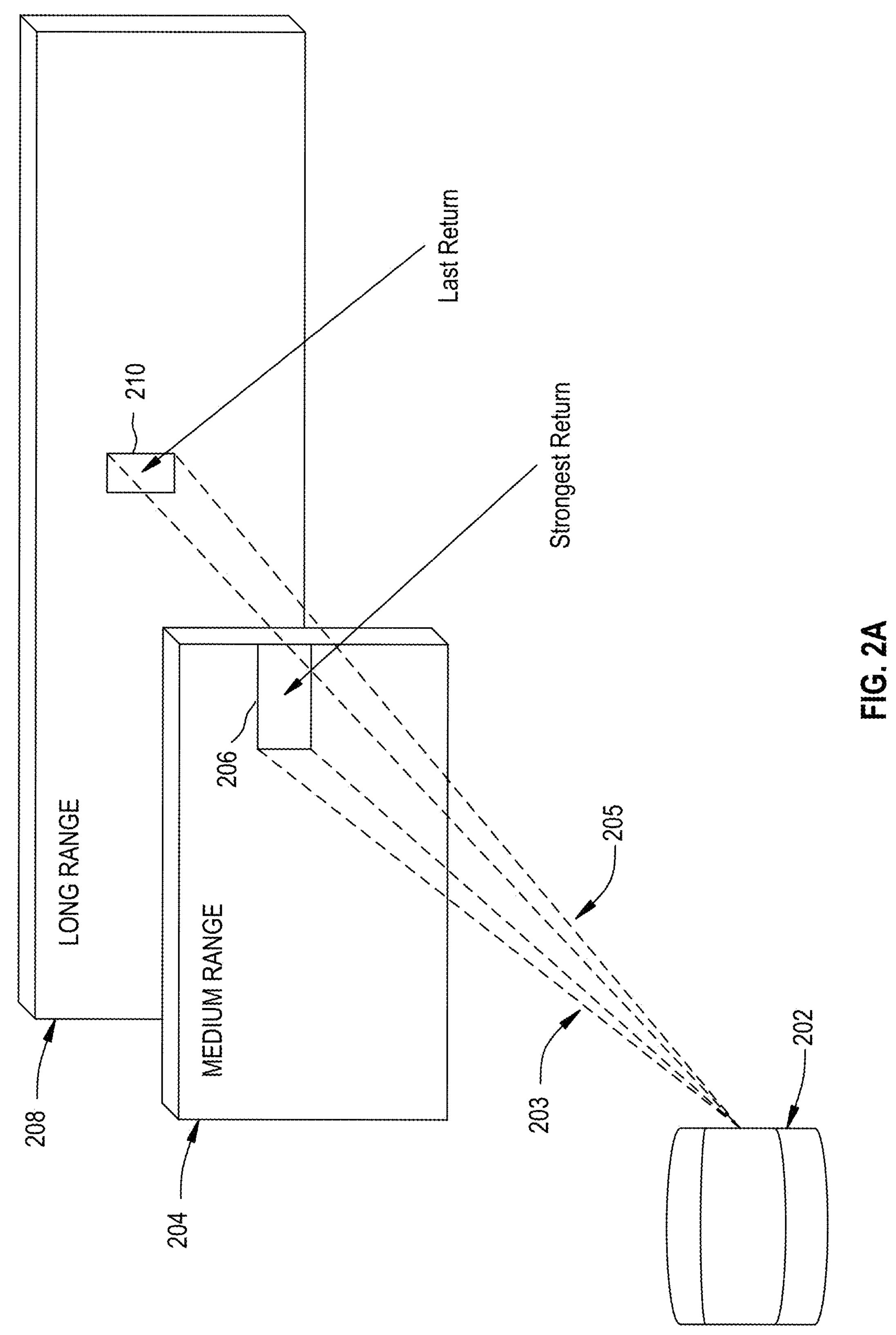
FIG. 2A is an illustration of the operation of a lidar system, in accordance with some embodiments.

FIG. 2A illustrates the operation of a lidar system 202, in accordance with some embodiments. In the example of FIG. 2A, two return light signals 203 and 205 are shown. Because laser beams generally tend to diverge as they travel through a medium, a single laser emission may hit multiple objects at different ranges from the lidar system 202, producing multiple return signals 203, 205. The lidar system 202 may analyze multiple return signals 203, 205 and report one of the return signals (e.g., the strongest return signal, the last return signal, etc.) or more than one (e.g., all) of the return signals. In the example of FIG. 2A, lidar system 202 emits laser light in the direction of near wall 204 and far wall 208. As illustrated, the majority of the emitted light hits the near wall 204 at area 206 resulting in a return signal 203, and another portion of the emitted light hits the far wall 208 at area 210 resulting in a return signal 205. Return signal 203 may have a shorter TOF and a stronger received signal strength compared to return signal 205. In both single- and multiple-return lidar systems, it is important that each return signal is accurately associated with the transmitted light signal so that one or more attributes of the object reflecting the light signal (e.g., range, velocity, reflectance, etc.) can be correctly estimated.

Some embodiments of a lidar system may capture distance data in a two-dimensional ("2D") (e.g., within a single plane) point cloud manner. These lidar systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the lidar system to achieve 90-180-360 degrees of azimuth (horizontal) view while simplifying both the system design and manufacturability. Many applications require more data than just a 2D plane. The 2D point cloud may be expanded to form a 3D point cloud, in which multiple 2D point clouds are used, each corresponding to a different elevation (e.g., a different position and/or direction with respect to a vertical axis). Operational parameters of the receiver of a lidar system may include the horizontal FOV and the vertical FOV.

Figure 2B:
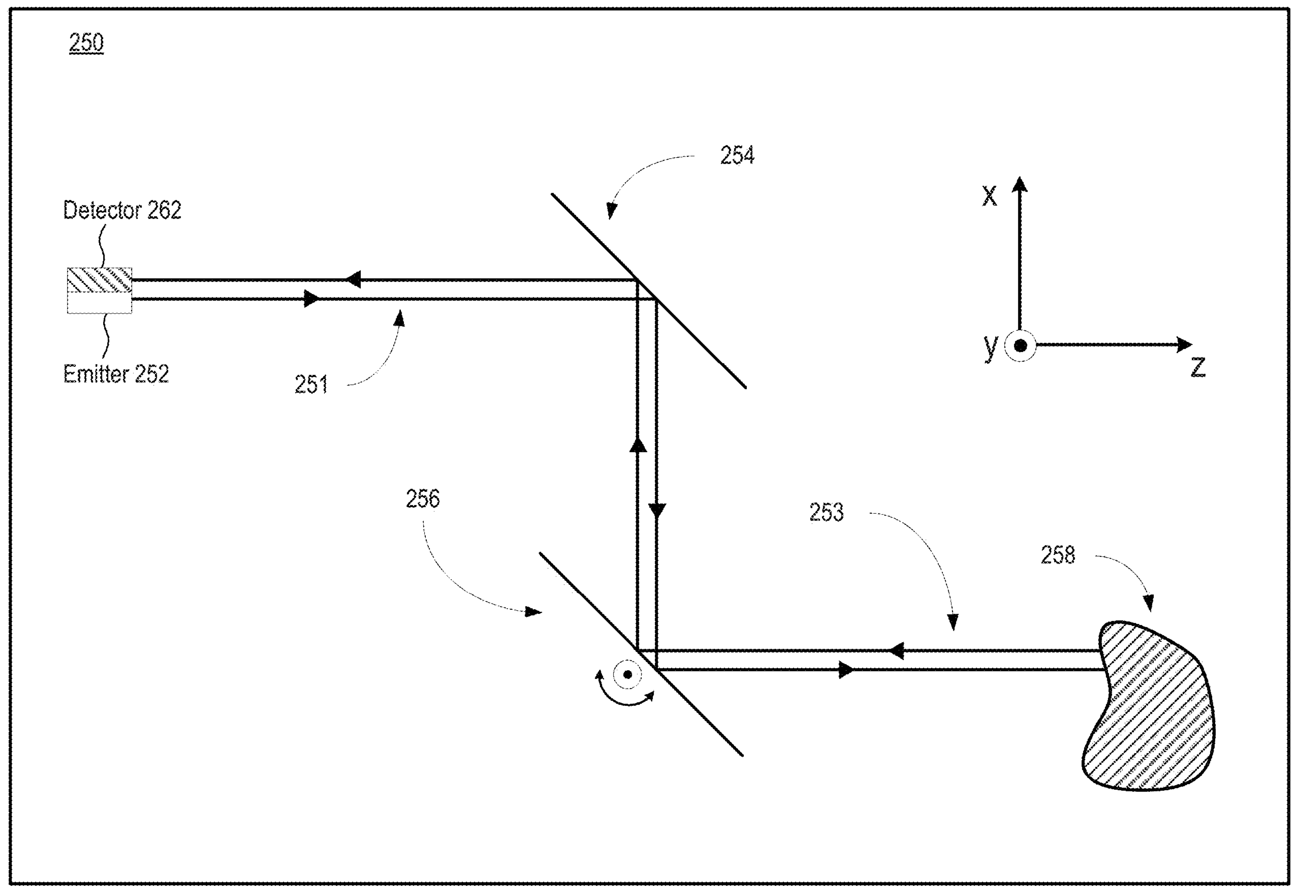
FIG. 2B is an illustration of optical components of a channel of a lidar system with a movable mirror, in accordance with some embodiments.

FIG. 2B depicts a lidar system 250 with a movable (e.g., rotating or oscillating) mirror, according to some embodiments. In the example of FIG. 2B, the lidar system 250 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The emitted laser signal 251 may be directed to a fixed mirror 254, which may reflect the emitted laser signal 251 to the movable mirror 256. As movable mirror 256 moves (e.g., oscillates), the emitted laser signal 251 may reflect off an object 258 in its propagation path. The reflected return signal 253 may be coupled to the detector 262 via the movable mirror 256 and the fixed mirror 254. In some embodiments, the movable mirror 256 is implemented with mechanical technology or with solid state technology (e.g., MEMS).

Figure 2C:
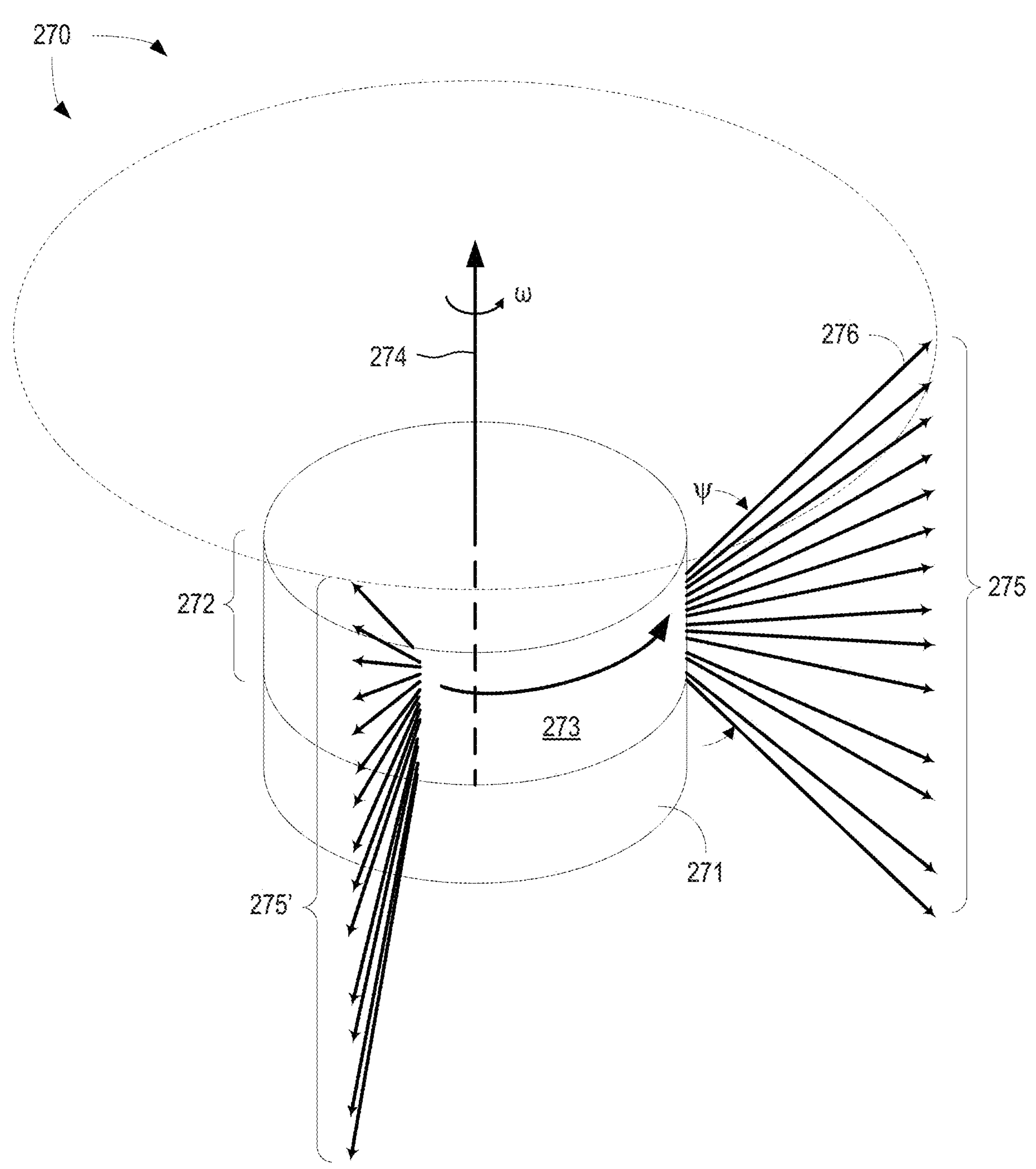
FIG. 2C is an illustration of an example of a 3D lidar system, in accordance with some embodiments.

FIG. 2C depicts a 3D lidar system 270, according to some embodiments. In the example of FIG. 2C, the 3D lidar system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D lidar system 270 includes a lidar transceiver, such as transceiver 102 shown in FIG. 1, operable to emit laser beams 276 through the cylindrical shell element 273 of the upper housing 272. In the example of FIG. 2C, each individual arrow in the sets of arrows 275, 275' directed outward from the 3D lidar system 270 represents a laser beam 276 emitted by the 3D lidar system. Each beam of light emitted from the system 270 (e.g., each laser beam 276) may diverge slightly, such that each beam of emitted light forms a cone of light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D lidar system 270. The direction of each emitted beam may be determined by the angular orientation w of the transceiver's transmitter 104 with respect to the system's central axis 274 and by the angular orientation ψ of the transmitter's movable mirror (e.g., similar or identical to movable mirror 256 shown in FIG. 2B) with respect to the mirror's axis of oscillation (or rotation). For example, the direction of an emitted beam in a horizontal dimension may be determined by the transmitter's angular orientation ω, and the direction of the emitted beam in a vertical dimension may be determined by the angular orientation ψ of the transmitter's movable mirror. Alternatively, the direction of an emitted beam in a vertical dimension may be determined the transmitter's angular orientation ω, and the direction of the emitted beam in a horizontal dimension may be determined by the angular orientation ψ of the transmitter's movable mirror. (For purposes of illustration, the beams of light 275 are illustrated in one angular orientation relative to a non-rotating coordinate frame of the 3D lidar system 270 and the beams of light 275' are illustrated in another angular orientation relative to the non-rotating coordinate frame.)

The 3D lidar system 270 may scan a particular point (e.g., pixel) in its field of view by adjusting the angular orientation ω of the transmitter and the angular orientation ψ of the transmitter's movable mirror to the desired scan point (ω, ψ) and emitting a laser beam from the transmitter 104. Accordingly, the 3D lidar system 270 may systematically scan its field of view by adjusting the angular orientation w of the transmitter and the angular orientation ψ of the transmitter's movable mirror to a set of scan points ($\omega_i$, $\psi_j$) and emitting a laser beam from the transmitter 104 at each of the scan points.

Assuming that the optical component(s) (e.g., movable mirror 256) of a lidar transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location LO on the detector. This time period is referred to herein as the "ranging period" or "listening period" of the scan point associated with the transmitted beam 110 and the return beam 114.

In many lidar systems, the optical component(s) of a lidar transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location LO of the spot that would have been formed absent the intervening rotation of the optical component(s) during the ranging period is referred to herein as "walk-off."

Figure 2D:
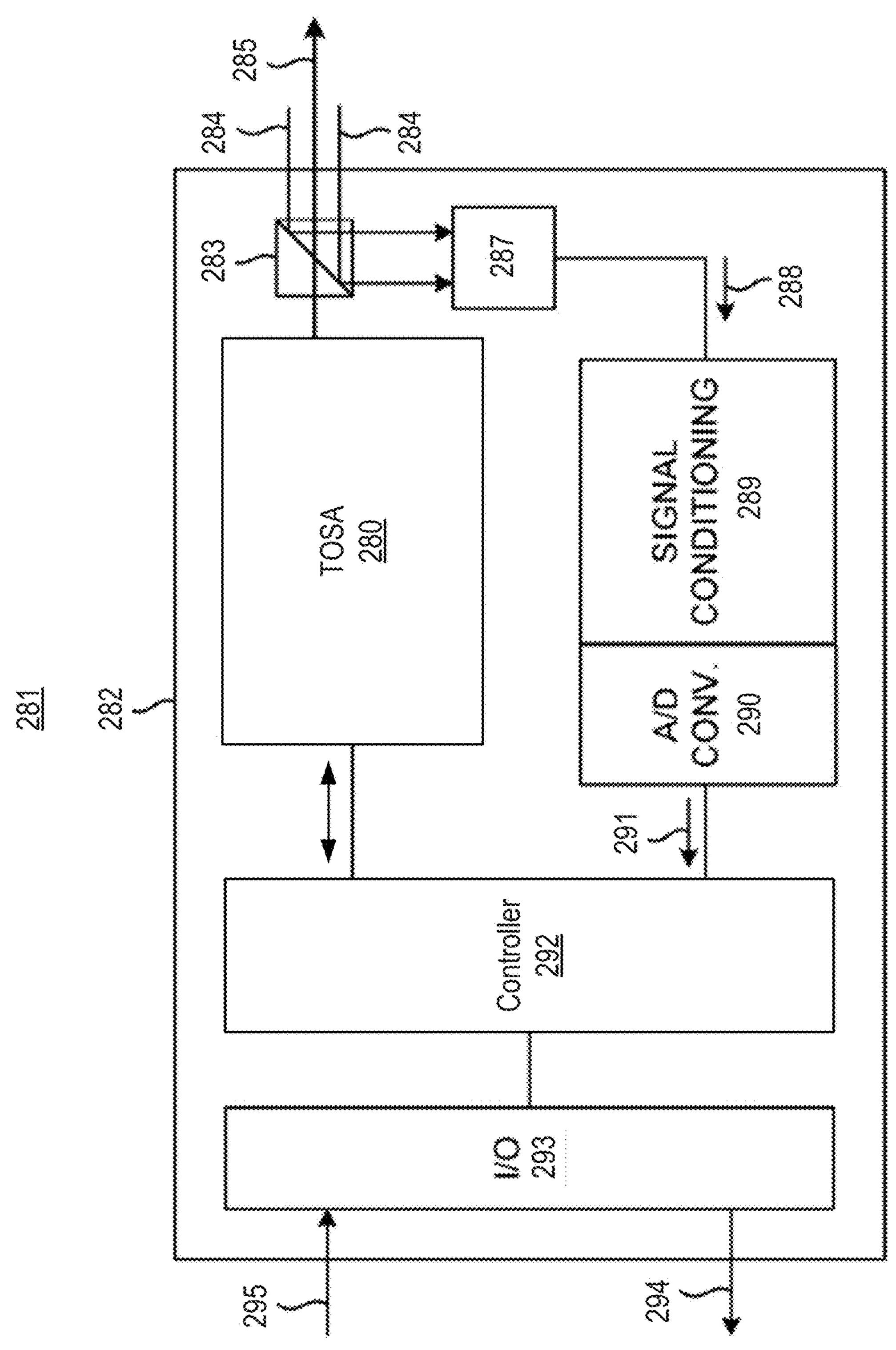
FIG. 2D is a block diagram of a transmitter-receiver optical sub-assembly (TROSA), according to some embodiments.

Referring to FIG. 2D, a block diagram of a transmitter-receiver optical subassembly (TROSA) 281 is shown, according to some embodiments. In some embodiments, the TROSA 281 may include a TOSA 280, an optical detector 287, a beam splitter 283, signal conditioning electronics 289, an analog to digital (A/D) converter 290, controller 292, and digital input/output (I/O) electronics 293. In some embodiments, the TROSA components illustrated in FIG. 2D are integrated onto a common substrate 282 (e.g., printed circuit board, ceramic substrate, etc.). In some embodiments, the TROSA components illustrated in FIG. 2D are individually mounted to a common substrate 282. In some embodiments, groups of these components are packaged together and the integrated package(s) is/are mounted to the common substrate.

The TOSA 280 may include one or more light sources and may operate the light source(s) safely within specified safety thresholds. A light source of the TOSA may emit an optical signal (e.g., laser beam) 285.

A return signal 284 may be detected by the TROSA 281 in response to the optical signal 285 illuminating a particular location. For example, the optical detector 287 may detect the return signal 284 and generate an electrical signal 288 based on the return signal 284. The controller 292 may initiate a measurement window (e.g., a period of time during which collected return signal data are associated with a particular emitted light signal 285) by enabling data acquisition by optical detector 287. Controller 292 may control the timing of the measurement window to correspond with the period of time when a return signal is expected in response to the emission of an optical signal 285. In some examples, the measurement window is enabled at the time when the optical signal 285 is emitted and is disabled after a time period corresponding to the time of flight of light over a distance that is substantially twice the range of the lidar device in which the TROSA 281 operates. In this manner, the measurement window is open to collect return light from objects adjacent to the lidar device (e.g., negligible time of flight), objects that are located at the maximum range of the lidar device, and objects in between. In this manner, other light that does not contribute to a useful return signal may be rejected.

In some embodiments, the signal analysis of the electrical signal 288 produced by the optical detector 287 is performed by the controller 292, entirely. In such embodiments, the signals 294 provided by the TROSA 281 may include an indication of the distances determined by controller 292. In some embodiments, the signals 294 include the digital signals 291 generated by the A/D converter 290. These raw measurement signals 291 may be processed further by one or more processors located on board the lidar device or external to the lidar device to arrive at a measurement of distance. In some embodiments, the controller 292 performs preliminary signal processing steps on the signals 291 and the signals 294 include processed data that are further processed by one or more processors located on board the lidar device or external to the lidar device to arrive at a measurement of distance.

In some embodiments a lidar device (e.g., a lidar device 100, 202, 250, or 270) includes multiple TROSAs 281. In some embodiments, a delay time is enforced between the firing of each TROSA and/or between the firing of different light sources within the same TROSA. In some examples, the delay time is greater than the time of flight of the light signal 285 to and from an object located at the maximum range of the lidar device, to reduce or avoid optical cross-talk among any of the TROSAs 281. In some other examples, an optical signal 285 is emitted from one TROSA 281 before a return signal corresponding to a light signal emitted from another TROSA 281 has had time to return to the lidar device. In these embodiments, there may be sufficient spatial separation between the areas of the surrounding environment interrogated by the light signals of these TROSAs to avoid optical cross-talk.

In some embodiments, digital I/O 293, A/D converter 290, and signal conditioning electronics 289 are integrated onto a single, silicon-based microelectronic chip. In another embodiment, these same elements are integrated into a single gallium-nitride or silicon based circuit that also includes components of the TOSA 280 (e.g., an illumination driver). In some embodiments, the A/D converter 290 and controller 292 are combined as a time-to-digital converter.

As depicted in FIG. 2D, return light 284 reflected from the surrounding environment is detected by optical detector 287. In some embodiments, optical detector 287 includes one or more avalanche photodiodes (APDs) and/or single-photon avalanche diodes (SPADs). Any suitable optical detector may be used. In some embodiments, optical detector 287 generates an output signal 288 that is amplified by signal conditioning electronics 289. In some embodiments, signal conditioning electronics 289 include an analog trans-impedance amplifier. However, in general, the amplification of output signal 288 may include multiple amplifier stages. In this sense, an analog transimpedance amplifier is provided by way of non-limiting example, as many other analog signal amplification schemes may be used.

In some embodiments, the amplified signal is communicated to A/D converter 290, and the digital signals generated by the A/D converter are communicated to controller 292. Controller 292 may generate an enable/disable signal to control the timing of data acquisition by ADC 290.

As depicted in FIG. 2D, the optical signal 285 emitted from the TROSA 281 and the return signal 284 directed toward the TROSA 281 share a common path within the lidar device. In the embodiment depicted in FIG. 2D, the return light 284 is separated from the emitted light 285 by a beam splitter 283. The beam splitter may direct the light 285 emitted by the TOSA 280 toward the lidar device's environment, and direct the return light 284 to the optical detector 287. Any suitable beam splitter may be used, including (without limitation) a polarizing beam splitter, nonpolarizing beam splitter, dielectric film, etc.). Some non-limiting examples of suitable beam splitters are described in International Patent Publication No. WO 2017/164989.

Power Monitoring Circuitry

As described herein, transmitters, receivers, and/or other optical components of a lidar device may degrade over time as the lidar device is operated, which can reduce the intensity and/or range of emitted optical signals and/or reduce measurement accuracy. Accordingly, there exists a need for a system and method to monitor the channel(s) of a lidar device to determine the intensity of the emitted signals, such that degradation of device performance may be identified and remedied.

Figure 3:
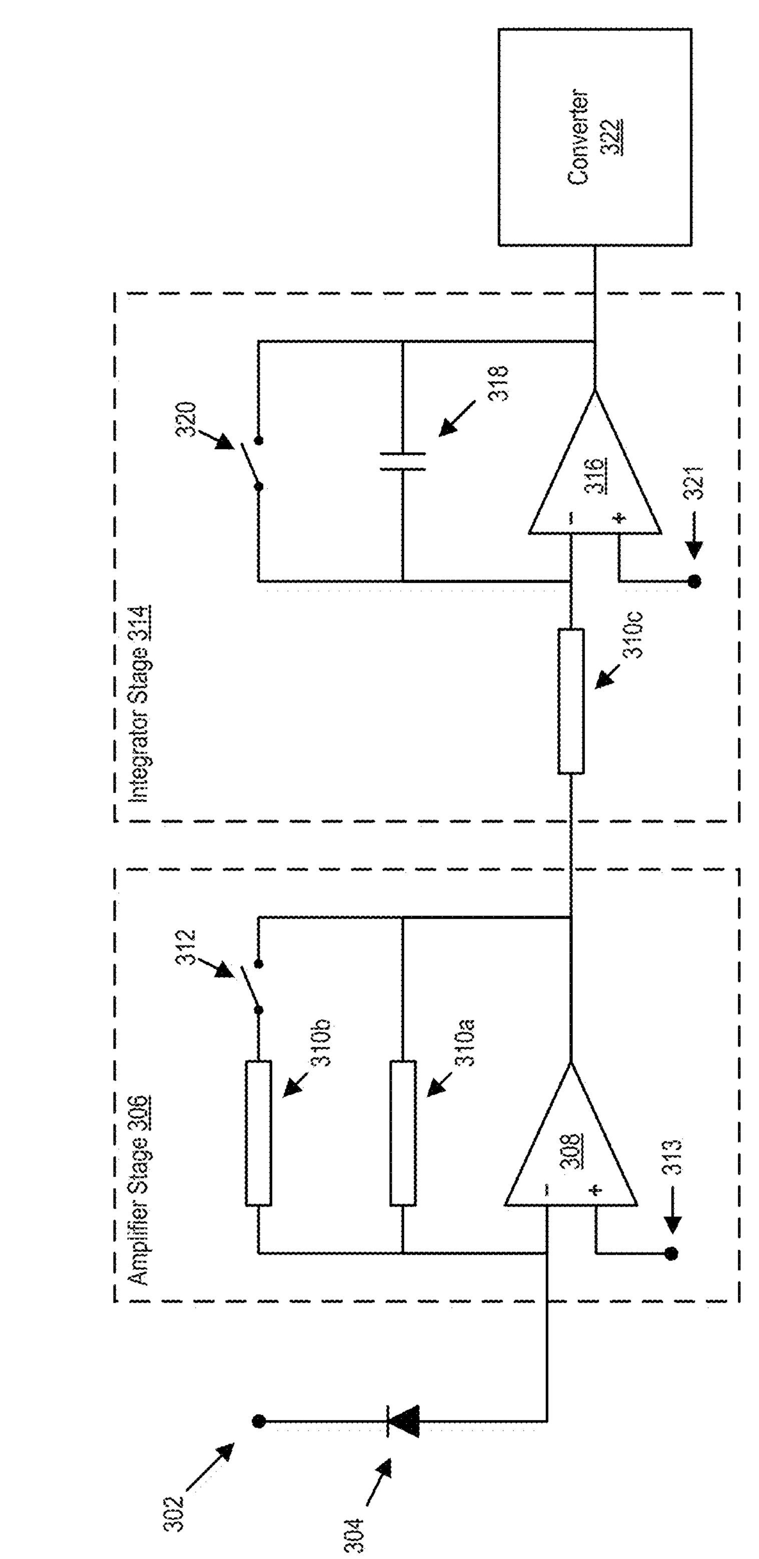
FIG. 3 is a schematic diagram of a power monitoring circuit, according to some embodiments.

FIG. 3 is an illustration of an example power monitoring circuit 301 for monitoring the intensity of optical signals emitted by a lidar device. The power monitoring circuit 301 includes a photodiode 304, an amplifier stage 306, an integrator stage 314, and a converter 322. The photodiode 304 may be or include a semiconductor device configured to convert an optical signal into an electrical signal (e.g., a current). Any other suitable photosensitive device (e.g., such as any of the optical detectors described herein) may be used in place of the photodiode 304. In some cases, the power monitoring circuit 301 may include more than one photodiode 304, for example, with each photodiode 304 being positioned in a different location within a lidar device. The photodiode 304 may measure intensities of emitted optical signals from one or more channels of the lidar device and/or may measure intensities of reflections of the optical signals (e.g., returning from a maintenance area inside the lidar device or from a surface of a window in the lidar device). A first end (e.g., the cathode) of the photodiode 304 may be electrically coupled to a voltage bias 302. As an example, the voltage bias 302 may be a direct current (DC) bias voltage (e.g., reverse bias voltage) of approximately 5 V. The voltage bias 302 may be configured based on the desired capacitance of the photodiode 304. For example, an increase in the voltage bias 302 may correspond to a decrease in the capacitance of the photodiode 304. A second end (e.g., the anode) of the photodiode 304 may be electrically coupled to an amplifier stage 306. The electrical signal converted by the photodiode 304 may be provided as an input to the amplifier stage 306.

In some embodiments, the amplifier stage 306 may be configured as a transimpedance amplifier (TIA). The amplifier stage 306 may include an operational amplifier 308 and one or more loads 310, which may be, for example, resistive loads. The operational amplifier 308 may include a negative input terminal, a positive input terminal, and an output terminal. The operational amplifier 308 may include one or more supply terminals that are each configured to receive and/or connect to a respective supply voltage. A supply voltage coupled to each supply terminal of the operational amplifier 308 may be any suitable voltage. The second end of the photodiode 304 may be electrically coupled to a negative input terminal of the operational amplifier 308 and first ends of a resistive load 310*a* and a resistive load 310*b*. The negative input terminal of the operational amplifier 308 and the first ends of the resistive load 310*a* and the resistive load 310*b* may be electrically coupled. A positive input terminal of the operational amplifier 308 may be coupled to a reference bias voltage 313. As an example, the reference bias voltage 313 may be approximately 4 V. A second end of the resistive load 310*b* may be coupled to a first end of an electrical switch 312 (alternatively referred to as a "gain control"). Second ends of the electrical switch 312 and the resistive load 310*a* and the output terminal of the operational amplifier 308 may be electrically coupled. The second ends of the electrical switch 312 and the resistive load 310*a* and the output terminal of the operational amplifier 308 may be electrically coupled to an input of the integrator stage 314. As an example, the second ends of the electrical switch 312 and the resistive load 310*a* and the output terminal of the operational amplifier 308 may each be electrically coupled to a first end of a resistive load 310*c* in the integrator stage 314.

In some embodiments, the amplifier stage 306 may amplify and/or otherwise provide a gain to an electrical signal (e.g., current) converted by the photodiode 304. In some cases, the amplifier stage 306 may convert a current provided by the photodiode 304 to a voltage, where the voltage may be provided by the amplifier stage 306 as an input to the integrator stage 314. Based on the position of the electrical switch 312 (e.g., "closed" or "connected" or "conducting" vs. "open" or "disconnected" or "non-conducting"), the amplifier stage 306 may provide a variable gain, with the gain configured based on the resistance of each of the resistive loads 310*a* and 310*b*. In an example, the resistive loads 310*a* and 310*b* may be configured such that the amplifier stage 306 may provide a gain from about 200 to about 3000 to an electrical signal (e.g., generated by the photodiode). In another example, the amplifier stage 306 may provide a first (e.g., lower) gain when the electrical switch 312 is connected and may provide a second (e.g., higher) gain when the switch 312 is disconnected. Any suitable resistance may be configured for the resistive loads 310*a* and 310*b* based on the design of the amplifier stage 306 and the configuration of the operational amplifier 308.

In some embodiments, the integrator stage 314 may include an operational amplifier 316, one or more loads, including the resistive load 310*c* and a capacitive load 318, and an electrical switch 320 (alternatively referred to as an "integration control"). The operational amplifier 316 may include a negative input terminal, a positive input terminal, and an output terminal. The operational amplifier 316 may include one or more supply terminals that are each configured to receive and/or connect to a respective supply voltage. A supply voltage coupled to each supply terminal of the operational amplifier 316 may be any suitable voltage. A first end of the resistive load 310*c* may be electrically coupled to an output of the amplifier stage 306. The first end of the resistive load 310*c* may be electrically coupled to the second ends of the electrical switch 312 and the resistive load 310*a* and the output terminal of the operational amplifier 308. The negative input terminal of the operational amplifier 316 and first ends of the capacitive load 318 and the electrical switch 320 may be electrically coupled. A positive input terminal of the operational amplifier 316 may be coupled to a reference bias voltage 321. As an example, the reference bias voltage 321 may be approximately 1 V. A second end of the resistive load 310*c* may be electrically coupled to the negative input terminal of the operational amplifier 316 and the first ends of the capacitive load 318 and the electrical switch 320. An output terminal of the operational amplifier 316 and second ends of the capacitive load 318 and the electrical switch 320 may be electrically coupled. The output terminal of the operational amplifier 316 and the seconds ends of the capacitive load 318 and the electrical switch 320 may be electrically coupled to an input of the converter 322.

In some embodiments, the integrator stage 314 may integrate an electrical signal (e.g., voltage) received from an output of the amplifier stage 306. Integrating an electrical signal may include determining an integral of an electrical signal over a duration of time. Integrating an electrical signal may include accumulating a voltage across the capacitive load 318. The integrated electrical signal may be stored as a voltage across the capacitive load 318, which may be discharged (e.g., to a baseline voltage) based on a position of the electrical switch 320. The resistance of the resistive load 310*c* may be configured based on the desired gain of the integrator stage 314. Any suitable resistance may be used for the resistive load 310*c*, for example, based on the design of the amplifier stage 306 and the configuration of the operational amplifier 308. In an example, the resistance for the resistive load 310*c* may be configured based on a configured gain (e.g., range of gains) for the amplifier stage 306. The electrical switch 320 may be configured as connected (closed) or disconnected (open). If the electrical switch 320 is configured in a disconnected position, an electrical signal may be integrated and/or otherwise accumulated by the integrator stage 314 and stored as a voltage (e.g., integrated and/or accumulated voltage) by the capacitive load 318. If the electrical switch 320 is configured in a connected position, a voltage stored by the capacitive load 318 may be discharged, such that the voltage across the capacitive load 318 decays to a baseline voltage (e.g., approximately 0 V) over time. In some cases, the position of the electrical switch 320 may control a duration for which an electrical signal is integrated. Integration of an electrical signal may begin when the position of the electrical switch 320 changes from connected to disconnected. Integration of the electrical signal may end when the position of the electrical switch 320 changes from disconnected to connected. The duration of integration by the integrator stage 314 may be the duration for which the electrical switch 320 is configured in a disconnected position. Any suitable capacitance may be configured for the capacitive load 318 based on the design of the amplifier stage 306 and the configuration of the operational amplifier 308. Any suitable capacitance may be configured for the capacitive load 318 based on the design of the integrator stage 314 and the configuration of the operational amplifier 316. In an example, the capacitance for the capacitive load 318 may be configured based on a pulse duration of a signal emitted by a lidar device, where the signal may be detected by the photodiode 304.

In some cases, an input of the converter 322 may be electrically coupled to the output terminal of the operational amplifier 316 and the second ends of the capacitive load 318 and the electrical switch 320. In some cases, the converter 322 may be an analog to digital converter (ADC), such as a slow speed ADC. An example of an ADC used as the converter 322 may be the LTC2312-12 converter rated for 500 kilo-samples per second (kSPS). The converter 322 may sample a voltage received from and/or provided by the integrator stage 314 to generate a digital output. The digital output of the converter 322 may be proportional to the magnitude of the sampled voltage. In some cases, the digital output of the converter 322 may be provided to a processor of a lidar device for further analysis. In an example, the digital output of the converter 322 may be provided to the control and data acquisition module 108 and/or the data analysis and interpretation module 109 for further analysis.

In some embodiments, the power monitoring circuit 301 may include or utilize a controller (e.g., the control and data acquisition module 108) that controls the configuration (e.g., the position) of the electrical switches 312 and 320. For the electrical switch 312, the controller may configure the gain of the amplifier stage 306 based on configuring the electrical switch 312 as connected or disconnected. The controller may configure the gain of the amplifier stage 306 based on a power level of the optical signal(s) emitted by transmitter (s) of a lidar device. In an example, for a transmitter with a high configured power level, the controller may configure the amplifier stage 306 to a low gain, such that the high power signal may be measured by the converter 322 (e.g., without saturation). In another example, for a transmitter with a low configured power level, the controller may configure the amplifier stage 306 to a high gain, such that the low power emitted signal may be measured by the converter 322. For the electrical switch 320, the controller may configure storage and/or discharge of an electrical signal based on configuring the electrical switch 312 as connected or disconnected. To detect and measure the intensity of an emitted signal from a lidar channel, the controller may disconnect the electrical switch 320, such that an electrical signal may be integrated by the integrator stage 314 and stored as voltage across the capacitive load 318. The converter 322 may sample the voltage stored by the capacitive load 318 and may generate a digital output as described herein. To reset the integrator stage 314, the controller may connect the electrical switch 320, such that a voltage stored by the capacitive load 318 may discharge and decay to approximately 0 V. After discharging the voltage stored by the capacitive load 318, the controller may disconnect the electrical switch 320 to allow for integration and/or storage of another electrical signal (e.g., corresponding to a measured emitted signal).

Configuration for Power Monitoring

In some embodiments, a lidar device may include one or more power monitoring circuits configured to measure the intensity of one or more emitted signals. A power monitoring circuit may measure the intensity of signals from one or more channels based on the positioning of the power monitoring circuit and the one or more channels.

Figure 4:
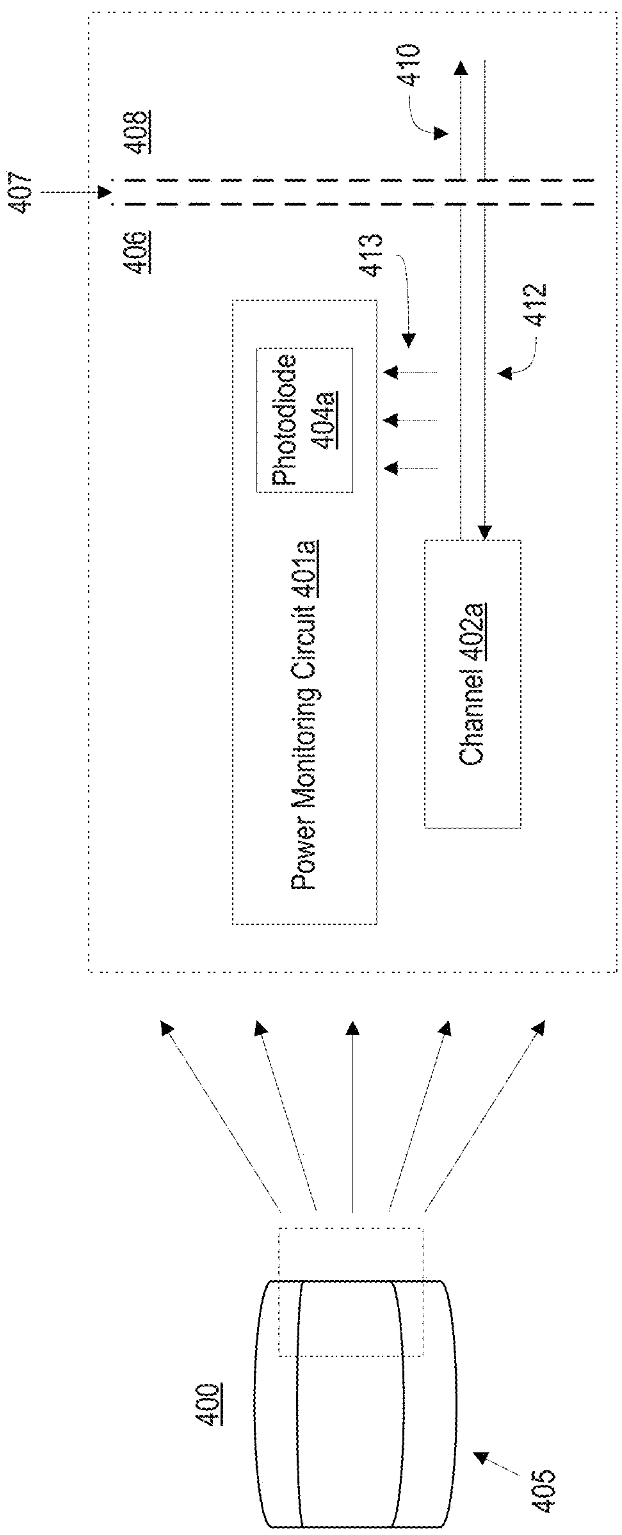
FIG. 4 is a schematic illustration of a configuration of a lidar device with a power monitoring circuit, according to some embodiments.

FIG. 4 depicts an example configuration of a power monitoring circuit in a lidar device 400. The lidar device 400 may include a housing 405 and a window 407. The lidar device 400 may include one or more channels 402, such as channel 402*a*, and one or more power monitoring circuits 401, such as power monitoring circuit 401*a*. The one or more power monitoring circuits 401 (e.g., power monitoring circuit 401*a*) may be the same as or may include one or more features described herein for the power monitoring circuit 301. The power monitoring circuit 401*a* may include one or more photodiodes 404, such as photodiode 404*a*. The power monitoring circuit 401*a* and/or the one or more photodiodes 404 may be configured in one or more positions within an interior 406 of the housing 405. The photodiode 404*a* may be positioned above the channel 402*a*, as shown in FIG. 4, or may be positioned below or to the side of the channel 402*a*. The photodiode 404*a* may be positioned in any suitable location within the lidar device 400 relative to the channel 404*a* (or any of the one or more channels 404), such that the photodiode 404*a* may measure the intensity of an emitted optical signal 410 and may allow the emitted optical signal 410 to propagate (e.g., unimpeded) to a surrounding environment 408 of the lidar device 400. In various examples, the photodiode 404*a* can measure the intensity of light (visible or invisible) associated with the emitted optical signal 410. Such light can be or include a portion of the emitted optical signal 410 (e.g., stray light) and/or reflections (e.g., diffuse reflections) associated with the optical signal 410, such as, for example, a reflection off the window 407, a reflection off a blockage (not shown) on the window 407, and/or a reflection off other components within the housing 405. In general, such light can be or include background or ambient light within the housing 405 that is detected by the photodiode 404*a*. In some examples, the photodiode 404*a* may measure an intensity of return signals (e.g., return signal 412) reflecting from the surrounding environment 408 to an interior 406 of the lidar device 400.

In some embodiments, the one or more channels 402 of the lidar device 400 may be configured with one or more operating modes in which an intensity of optical signals emitted by the channels can depend on the operating mode. For example, an operating mode can correspond to a respective amount of power applied to a transmitter in a channel 402 when emitting an optical signal 410. The intensity of the optical signal 410 can be based on the power applied to the channel for the respective operating mode. The optical signal 410 may propagate from the transmitter, through the interior 406 and the window 407 of the lidar device 400, and to the surrounding environment 408. The optical signal 410 may be reflected by one or more surfaces in the surrounding environment 408, which may produce one or more return signals 412 (e.g., reflected light). The one or more return signals 412 may propagate from the one or more surfaces, through the surrounding environment 408, the window 407, and the interior 406 of the lidar device 400, and may be received at a receiver of the channel 402*a*.

In some cases, when the transmitter of the channel 402*a* emits the optical signal 410, one or more incident signals 413 may be emitted incident to the photodiode 404*a*. The incident signal(s) 413 may be or include a portion of the optical signal 410 (e.g., stray light), reflections occurring on or within the lidar device (e.g., off the window 407), and/or a portion of the return signal 412 that is incident to a detection surface of the photodiode 404*a*. For example, the incident signal(s) 413 can be or include stray light, which can be or include light that originated with the optical signal 410 but does not follow an intended path or beam for the optical signal 410. Sources of stray light can include, for example, reflections (e.g., diffuse reflections), light scattering, or light leaks. The detection surface of the photodiode 404*a* may include a photosensitive element and/or may be configured to face an optical path of the channel 402*a* (e.g., represented by the path of the optical signal 410 and return signal(s) 412), such that the detection surface may receive the incident signal(s) 413. For example, the photodiode 404*a* may be positioned outside the optical path and/or may be oriented in a direction that is substantially orthogonal to the optical path. The photodiode 404*a* may measure the intensity of the incident signal 413, which may be proportional to and/or otherwise correlated with the intensity of the optical signal 410 and/or reflections of the optical signal (e.g., the return signal(s) 412). An electrical signal generated by the photodiode 404*a* can be a function of the intensity of the incident signal 413. In some cases, the intensity of the incident signal 413 can increase significantly when a blockage is present on the window 407 (e.g., due to light reflecting off the blockage), as described herein.

In various examples, the lidar device 400 may include one or more power monitoring circuits 401 and one or more corresponding photodiodes 404 for each power monitoring circuit 401. The number of power monitoring circuits 401 and/or photodiodes included in the lidar device 400 can depend on the number of channels 402 included in the lidar device 400. In an example, a power monitoring circuit 401 may include three photodiodes 404, where each of the three photodiodes 404 may independently measure the intensities of emitted optical signals (and return signals). The positioning of the one or more channels 402 may determine the number of power monitoring circuits 401 and corresponding photodiodes included in the lidar device 400. For example, in some instances, one or more photodiodes 404 may be associated with and/or adjacent to at least one channel 402 (e.g., channel 402*a*), to measure the intensities of incident signals 413 for the at least one channel 402, as described herein.

Method for Power Monitoring

Figure 5:
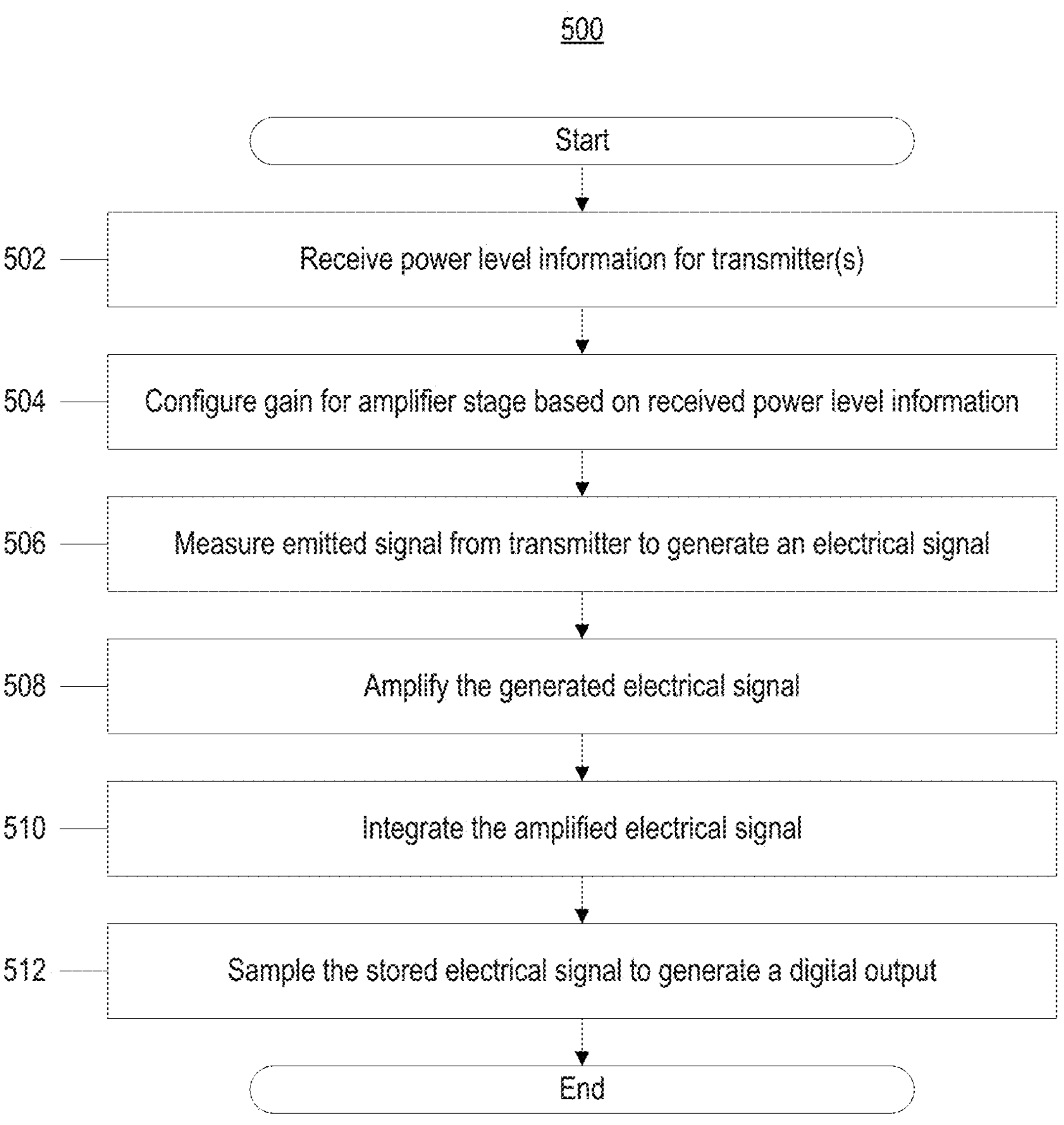
FIG. 5 shows a flowchart of a method for monitoring optical power at a lidar device via a power monitoring circuit, according to some embodiments.

FIG. 5 includes a flowchart of an example method 500 for monitoring optical power in a lidar device via a power monitoring circuit (e.g., the power monitoring circuit 301). At step 502, the power monitoring circuit may receive operating mode information for one or more transmitters of a lidar device. The operating mode information may include an indication of an operating mode for the one or more transmitters of the lidar device. The indication of the operating mode may be or include, for example, a power setting (e.g., applied power) or a power capability (e.g., a maximum applicable power) for the one or more transmitters. In some cases, if one or more transmitters are configured with different operating modes, the power monitoring circuit may receive an indication of the different operating modes. A controller of the power monitoring circuit may receive the indication of the operating mode.

At step 504, the controller of the power monitoring circuit may configure the gain of an amplifier stage (e.g., the amplifier stage 306) based on the received operating mode information. The controller may configure the amplifier stage with a low gain when the operating mode indicates an applied power that is equal to or exceeds a threshold power level. As described herein, the controller may configure the amplifier stage with a high gain by opening or disconnecting an electrical switch (e.g., the electrical switch 312). The controller may configure the amplifier stage with a high gain when the operating mode information indicates an applied power that is equal to or less than a threshold power level. As described herein, the controller may configure the amplifier stage with a low gain by closing or connecting the electrical switch (e.g., the electrical switch 312).

In some embodiments, at step 506, a photodiode (e.g., the photodiode 304) of the power monitoring circuit may measure an intensity associated with an emitted signal (e.g., an optical pulse) from a transmitter of a lidar device. In some cases, the photodiode may measure the emitted signals from more than one transmitter of the lidar device based on a configuration of the lidar device and the power monitoring circuit. During measurement of the emitted optical signal, the photodiode may generate a current that is proportional to the intensity of the signal(s) measured by the photodiode.

At step 508, an amplifier stage (e.g., the amplifier stage 306) may receive the current from the photodiode 304 as an input and may amplify the current based on the configuration (e.g., position) of the electrical switch (e.g., the electrical switch 312). The current may be amplified by a gain controlled by the configuration (e.g., position) of the electrical switch. An output of the amplification described by step 508 may be an amplified voltage signal corresponding to the emitted optical signal measured by the photodiode.

At step 510, an integrator stage (e.g., the integrator stage 314) may receive and integrate the amplified voltage signal from the amplifier stage. The amplified voltage signal may be integrated over a duration and stored as a voltage by a capacitive load (e.g., the capacitive load 318) as described herein. The amplified voltage signal may be integrated based on an electrical switch (e.g., the electrical switch 320) in the integrator stage being in a disconnected position.

At step 512, a converter (e.g., the converter 322) may sample the voltage stored by the capacitive load of the integrator stage to generate a digital output. The digital output may be proportional to the magnitude of the stored voltage. The digital output may be representative of the intensity of the emitted signal measured by the photodiode. In some cases, the digital output may be normalized based on the configured gain of the amplifier stage, such that the digital output may be compared to one or more other digital output measurements collected at a different configured gain. In some cases, the digital output may be stored on a memory of a lidar device and/or compared to subsequent measured digital outputs, as described herein.

Method for Reference Power Determination

In some embodiments, one or more power monitoring circuits (e.g., including the power monitoring circuit 301) may be used to determine reference (e.g., baseline) intensity measurements for signals emitted by each channel of a lidar device. The one or more reference measurements may be determined by the one or more power monitoring circuits (and corresponding photodiodes). A reference measurement may correspond to a measurement of the intensity of an optical signal emitted by a channel of the lidar device. A reference measurement may be collected during manufacturing of the lidar device (e.g., as a part of a calibration method) and/or prior to use of the lidar device (e.g., by an end user and/or in an end product). As described herein, channels of a lidar device may degrade or drift over time, leading to reduced measurement accuracy and/or performance capabilities (e.g., capabilities to map surroundings or provide environmental range data). In some examples, reference measurements may be collected for each of the channels (e.g., for each operating mode), such that, during operation of the lidar device, the measured intensity of an optical signal (e.g., the incident signal 413) may be compared to a corresponding reference measurement. Based on the comparison, the lidar device can determine if the optical signal intensity has changed since the reference measurement was collected. In some cases, reference measurements may be used for blockage detection, as described herein. For example, power measurements may be collected for optical signals during operation of the lidar device and compared to the reference measurements. Based on the comparison, the lidar device may determine that a blockage is present at a window of the lidar device.

In some embodiments, as described herein, a channel of a lidar device may have a field of view (FOV) that encompasses a range of optical signal angles or directions (e.g., as described herein with respect to FIG. 2B), with respect to the lidar device. For example, a transmitter of a channel may have a configurable vertical and/or horizontal FOV. In some cases, the FOV for a channel may be or include a region corresponding to a window (e.g., window 407) of the lidar device. When scanning an external environment, the transmitter may send optical signals through the window and into a scanning area defined by the FOV. Additionally or alternatively, when taking reference measurements, the transmitter may be configured to emit optical signals to locations that are outside the FOV and/or inside the lidar device. Such locations can be referred to herein as "maintenance areas" and can include, for example, regions inside the lidar device that are above, below, or to a side of the window or FOV. Reference measurements may be collected by emitting optical signals toward a maintenance area for some or all the channels of the lidar device.

Figure 6A:
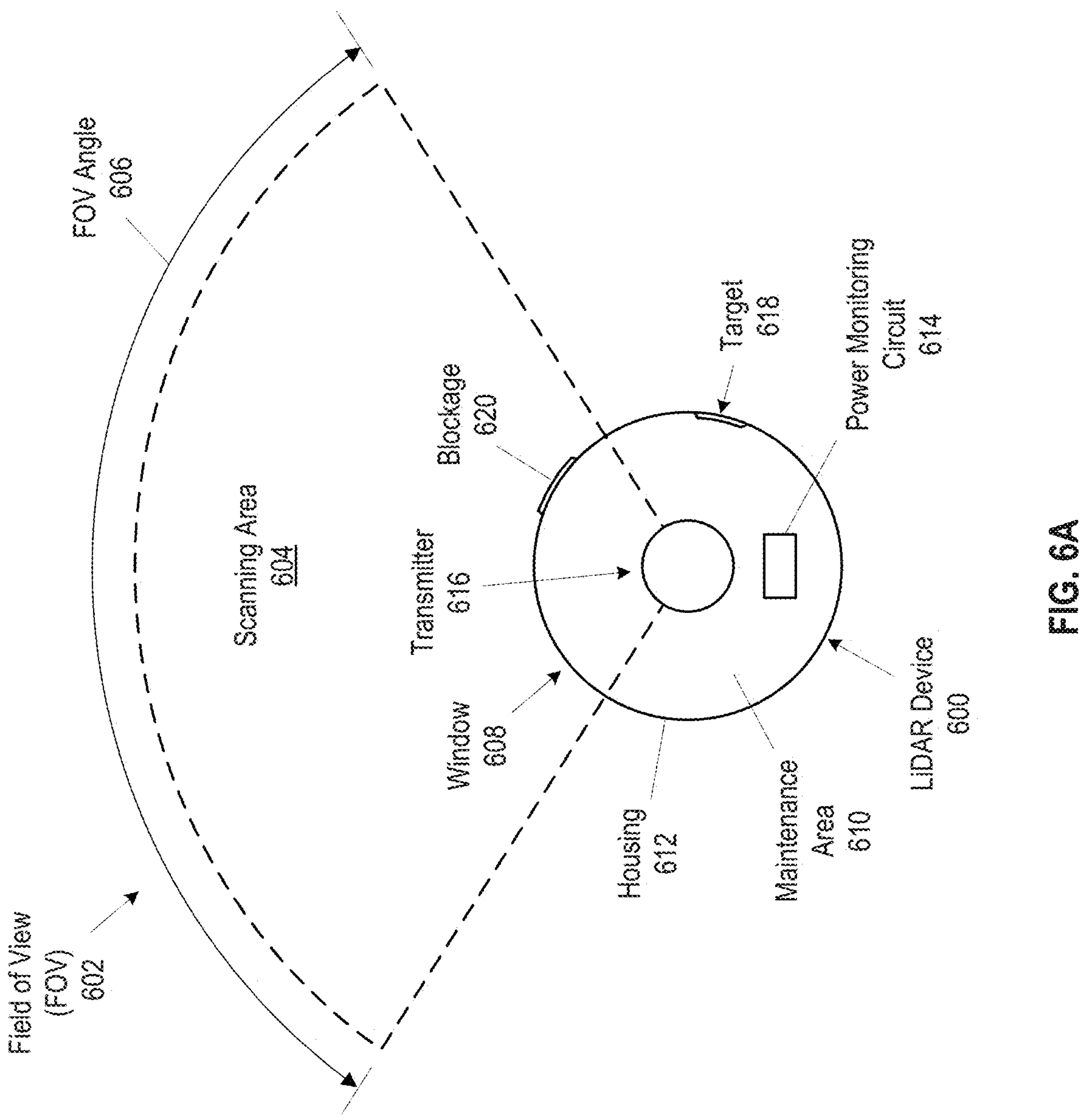
FIG. 6A is a schematic top view of a field of view (FOV) corresponding to a lidar device, according to some embodiments.

For example, FIG. 6A is a schematic, top view of a lidar device 600 having a field of view (FOV) 602 encompassing a scanning area 604 (e.g., an area of the environment being scanned). An angle 606 of the FOV 602 can be, for example, from about 30° to about 170°. The FOV 602 can correspond to or be defined by a window 608 on the lidar device (e.g., the window 407), through which optical signals can be sent into the scanning area 604. Locations outside the FOV 602 can correspond to one or more maintenance areas 610 inside an external housing 612 of the lidar device 600. For example, a maintenance area 610 may be or include a region that is outside the FOV 602 but within about 5°, within about 10°, or within about 20° of the FOV 602.

In various implementations, the lidar device 600 includes a power monitoring circuit 614 (e.g., the power monitoring circuit 401*a*) for monitoring optical signals associated with the lidar device. The power monitoring circuit 614 can measure incident signals (e.g., incident signals 413) associated with optical signals emitted by a transmitter 616 into the scanning area 604 and/or into the maintenance area 610, as described herein. A reference measurement can be taken, for example, by emitting an optical signal towards the maintenance area 610, which can include a target 618. The target 618 can be or include a reflective surface, a non-reflective surface, a white surface, a black surface, a matte surface, a glossy surface, and/or a mirrored surface. In one example, the target 618 includes a non-reflective, black surface. The target 618 can provide a consistent surface for taking reference measurements and comparing the reference measurements with other measurements. In some instances, for example, the reference measurements can be used to monitor an intensity or power associated with optical signals being emitted by the transmitter 616. When the intensity of the optical signals changes or drifts (e.g., due to equipment degradation or temperature variations), the intensity can be adjusted back to an original or target value. Such adjustments can be performed, for example, using a closed-loop or automatic control system, as described herein.

Additionally or alternatively, the power monitoring circuit 614 can take measurements when optical signals are being emitted towards the scanning area 604. In some instances, for example, a blockage 620 (e.g., a leaf or an insect) may appear on the window 608. The blockage 620 can reflect optical signals back into the lidar device 600. When such reflections are received by the power monitoring circuit 614, the power monitoring circuit 614 or other system component (e.g., an associated processor) can determine that the blockage 620 is present on the window 608, as described herein. A signal or message can be sent to alert a vehicle control system, a vehicle operator, or other system component about the presence of the blockage 618.

Figure 6B:
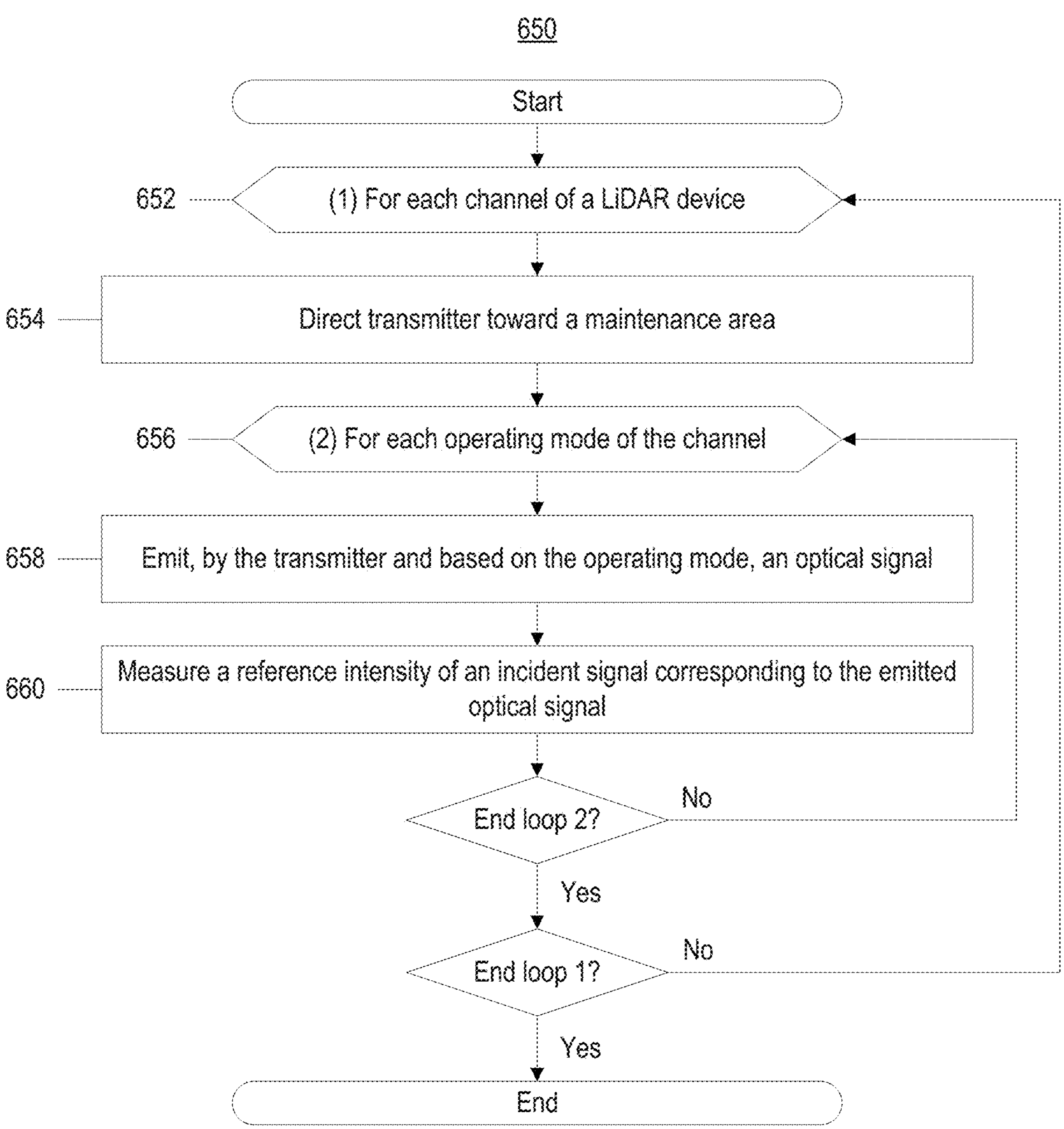
FIG. 6B shows a flowchart of a method for determining reference optical signal power at a lidar device, according to some embodiments.

FIG. 6B shows a flowchart of an example method 650 of taking reference intensity measurements in a lidar device (e.g., using one or more power monitoring circuits). As indicated by a loop header 652, step 654 of the method 650 may be performed for each channel of the lidar device. Likewise, as indicated by a loop header 656, steps 658 and 660 of the method 650 may be performed for each configurable operating mode of the channel (e.g., with each mode having a respective power level). For simplicity, the following paragraphs describe step 654 with reference to a single channel, and paragraphs describe steps 658 and 660 with reference to a single operating mode. It is understood, however, that step 654 may be performed in parallel for two or more (e.g., all) channels of the lidar device. The method 650 as described herein may be executed by a control module (e.g., control and data acquisition module 108) and/or a data analysis module (e.g., data analysis and interpretation module 109) of the lidar device.

In some embodiments, at step 654, a lidar device may aim, direct, or point a transmitter toward a maintenance area (e.g., the maintenance area 610). The lidar device may aim or point the transmitter toward a target (e.g., target 618) in the maintenance area. The lidar device may have multiple maintenance areas (or targets), and each maintenance area (or target) can be associated with a respective channel of the lidar device. For example, a first channel may be pointed at a first maintenance area, and a second channel may be pointed at a second maintenance area. Alternatively, each channel may use the same maintenance area. Any suitable maintenance area may be used for a channel and/or a reference measurement.

At step 658, for a configured operating mode, a transmitter of the lidar device may emit an optical signal toward the maintenance area. The optical signal may be or include a single optical pulse or a plurality of optical pulses. A power monitoring circuit (e.g., the power monitoring circuit 401*a*) may detect or receive an incident signal (e.g., incident signal 413) associated with the optical signal. The incident signal may include, for example, stray light and/or a reflection (e.g., off the maintenance area) associated with the optical signal.

At step 660, the power monitoring circuit may measure a reference intensity for the incident signal, as described herein (e.g., with respect to FIG. 5). The reference intensity may represent or correspond to an intensity of the emitted optical signal. Reference intensity measurements may be collected for each channel of the lidar device and/or for each configurable power level. In an example, for a lidar device that include 8 channels and 15 power levels, at least 120 reference intensity measurements (e.g., 8×15) may be collected, corresponding to each channel and power level combination. The reference measurements may be stored in a memory of the lidar device and/or a memory of a system controlling the lidar device.

In some embodiments, the method 600 may be performed using a system that communicates with a detection module (e.g., a program resident in a computer-readable storage medium and executed by a processor within the lidar device) and/or with control and data acquisition modules (e.g., control and data acquisition modules 108 for the lidar device). The method 600 may be performed prior to operation or installation of the lidar device. For example, the method 600 may be performed to calibrate the lidar device, during a manufacturing process.

Method for Channel Power Control

In some embodiments, reference measurements can be used to adjust or control optical signal intensity levels for the channels of a lidar device, which can degrade over time. For example, reference measurements can be taken periodically to determine if optical signals from a channel are changing in intensity. When changes are detected, the channel can be adjusted until an original or desired intensity value is obtained. This can involve, for example, adjusting an electrical power or current applied to the channel (e.g., increasing current to increase intensity).

Figure 7:
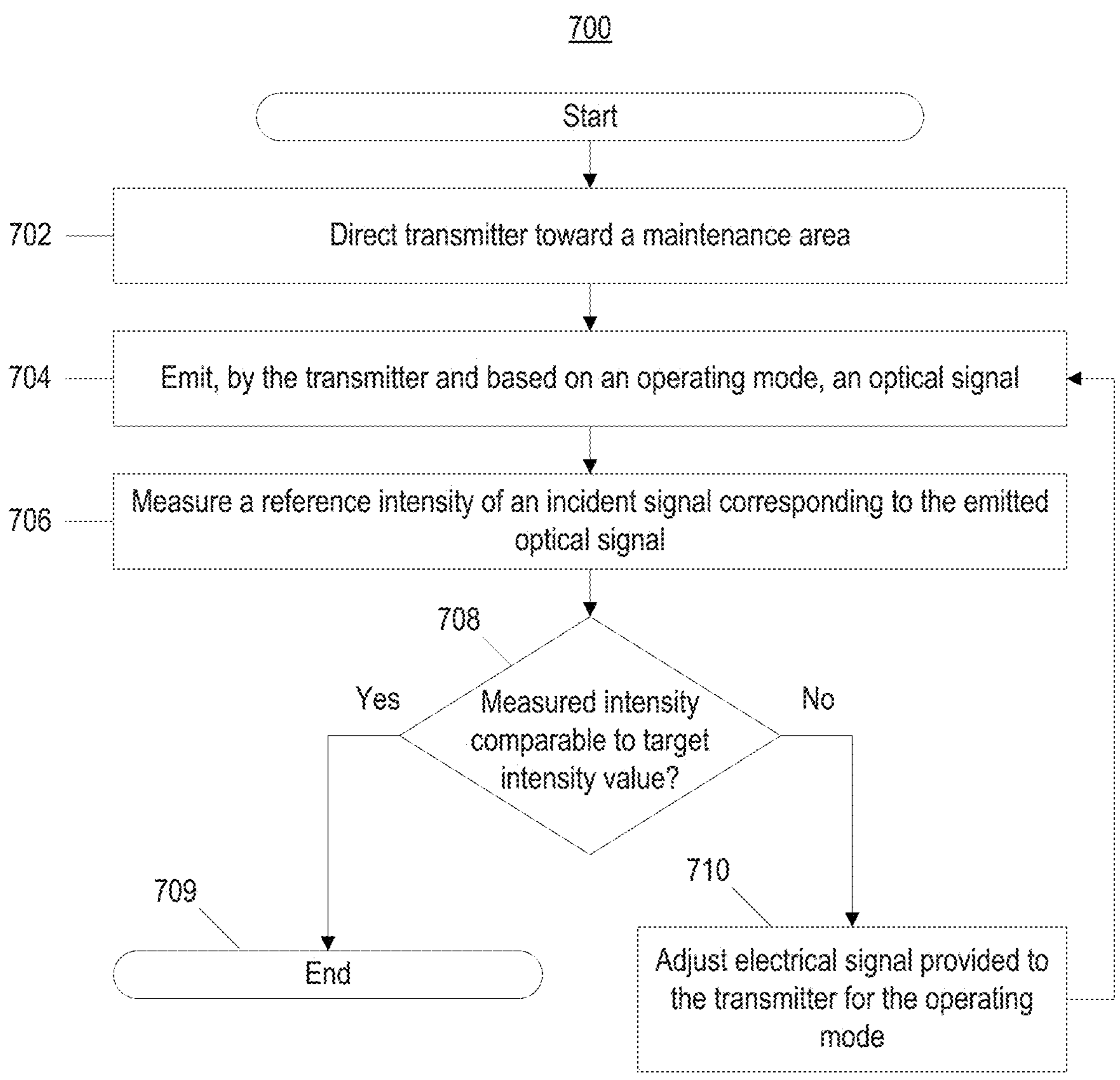
FIG. 7 shows a flowchart of a method for validating and modifying the optical signal power at a lidar device, according to some embodiments.

FIG. 7 includes a flowchart of an example method 700 for controlling (e.g., validating and/or modifying) the intensity of an emitted signal in a lidar device. The method 700 may be executed for each channel and/or operating mode of the lidar device. At step 702, a lidar device may aim, direct, or point a transmitter toward a maintenance area (e.g., the maintenance area 610). At step 704, the transmitter may emit an optical signal toward the maintenance area, using a power level corresponding to a current operating mode. The optical signal may be a single optical pulse or a plurality of optical pulses. The optical signal may be the same as an emitted optical signal described herein with respect to FIG. 6B.

At step 706, a power monitoring circuit (e.g., the power monitoring circuit 401*a*) may take a reference measurement by measuring an intensity of an incident signal associated with the optical signal. The incident signal may include, for example, stray light and/or a reflection (e.g., off the maintenance area) associated with the optical signal. The power monitoring circuit may determine the intensity of the incident signal as described herein (e.g., with respect to FIG. 5). The intensity of the incident signal may correspond to or represent an intensity of the emitted optical signal. For example, the intensity of the incident signal may be directly proportional to the intensity of the emitted optical signal.

In some embodiments, at step 708, the lidar device may compare the measured intensity (from step 706) with a target intensity value. The target intensity value may be or include, for example, a desired intensity value or an intensity from a previous reference measurement taken for the same channel and/or the same operating mode (e.g., when the lidar device was first manufactured or calibrated). If the measured intensity is equal or close to the target intensity value, there may be no need to adjust the channel and the method may end (step 709) or may move on to a different channel or operating mode. For example, a reference measurement that is within 5%, within 3%, or within 1% of the target value may be considered to be equal or close to the target intensity value.

Alternatively, in step 710, if the reference measurement is not equal or close to the target value, the channel can be adjusted. This can involve, for example, adjusting an electrical signal (e.g., power, voltage, and/or current) provided (e.g., applied) to the channel until the measured intensity for a reference measurement is equal or close to the target intensity value. Channel adjustment can include adjusting a power, voltage, and/or current provided to a channel's transmitter, where an intensity of an emitted optical signal is based on (e.g., dependent on) the magnitude of the power, voltage, and/or current provided to the channel's transmitter. A variety of control schemes and/or iterative techniques can be used to adjust the channel, including, for example, proportional control, proportional-integral control, proportional-derivative control, proportional-integral-derivative control, Newton's method, a bisection method, etc. An iterative technique can involve repeating steps 704, 706, 708, and 710 until the target intensity value is achieved. The power or current used to achieve the target intensity value can be recorded and/or used during subsequent measurements or use of the channel.

Method 700 can be repeated for additional channels and/or additional operating modes for a channel. Additionally or alternatively, method 700 can be repeated for a channel or operating mode at periodic intervals (e.g., once per day, once per week, or once per month), to confirm and/or adjust optical signal intensity levels, as needed.

Method for Blockage Detection

In some embodiments, a power monitoring circuit (e.g., the power monitoring circuit 401*a*) can be used to detect a blockage on or attached to a window of a lidar device (e.g., window 407). Some non-limiting examples of blockages include dirt, a leaf, an insect, rain, condensation, ice, snow, gum, tape, or any other foreign material. Compared to previous blockage detection techniques, use of the power monitoring circuit, as described herein, provides a higher degree of sensitivity and allows even small blockages to be detected, as they occur. Failure to detect and/or remove a blockage can prevent the lidar device from being able to scan and detect objects in the scanning area.

In various examples, the power monitoring circuit can use reference intensity measurements (e.g., taken in the maintenance area 610) to detect blockages. For example, a blockage can be detected based on a comparison of a reference intensity $I_R$ measurement and an intensity $I_S$ measurement taken in a scanning area (e.g., the scanning area 604). In some instances, for example, a ratio between the reference intensity $I_R$ and the intensity $I_S$ (e.g., $I_S/I_R$) and/or a difference between the reference intensity $I_R$ and the intensity $I_S$ (e.g., $I_S-I_R$) can be compared with a threshold value. For example, a lidar system may determine that a blockage is present (e.g., on a window of the lidar device) when the ratio or difference exceeds the threshold value (e.g., $I_S/I_R \geq$ threshold, or $I_S-I_R \geq$ threshold). The threshold value for $I_S/I_R$ may be, for example, about 1.1, about 1.3, about 2, about 4, or higher. In one experiment, a value of about 1.1 for $I_S/I_R$ corresponded to a very slight blockage, and a value of about 5.0 corresponded to a significant blockage.

In certain implementations, the threshold value may be selected based on a desired tolerance or sensitivity for blockage detection. To achieve a high sensitivity, for example, the threshold value may be small; however, a threshold value that is too small may result in false positives (e.g., detecting a blockage that does not exist or is too small to negatively influence lidar sensor performance). To achieve a low sensitivity, the threshold value may be large; however, a threshold value that is too large may result in a failure to detect blockages that have a material influence on lidar sensor performance.

In some cases, when a blockage is detected, the lidar device may send a notification to alert a user of the lidar device, a vehicle control system, and/or other system component about the existence of the blockage. The user may then remove the blockage to improve lidar performance.

Figure 8:
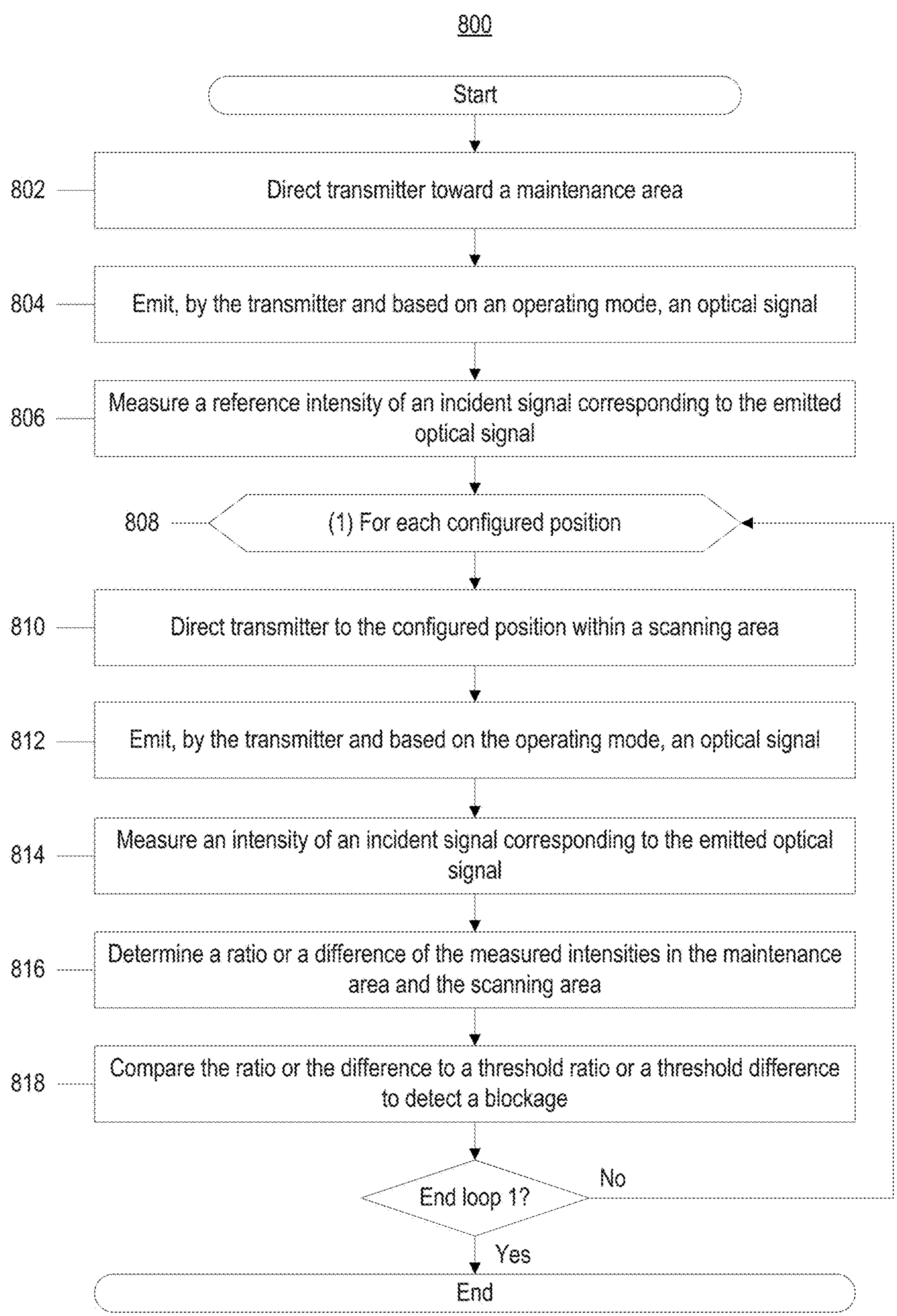
FIG. 8 shows a flowchart of a method for detecting a blockage at a lidar device, according to some embodiments.

FIG. 8 shows a flowchart of an example method 800 of using a power monitoring circuit (e.g., the power monitoring circuit 401*a*) to detect a blockage at a lidar device. The method 800 may be executed prior to or during operation of a vehicle associated with the lidar device. For example, the method 800 may be executed during a manufacturing process for the lidar device, after the manufacturing process, each time the vehicle is accessed or started by an operator, at periodic intervals during operation of the vehicle (e.g., while the lidar device is measuring the scanning area), and/or when lidar data suggests a blockage may be present (e.g., due to a loss of point cloud data accuracy). As indicated by the loop header 808, steps 810, 812, and 814 of the method 800 may be performed for each configured position of the lidar device relative to the scanning area (e.g., each measurement location or beam location or angle used during operation of the lidar device). For simplicity, the following paragraphs describe steps 810, 812, and 814 with reference to a single configured position within the scanning area.

At step 802, a lidar device may aim, direct, or point a transmitter toward a maintenance area (e.g., the maintenance area 610). At step 804, the transmitter may emit an optical signal toward the maintenance area, using a power level corresponding to a current operating mode. In some cases, the optical signal may be a single optical pulse. The optical signal may be a single optical pulse or a plurality of optical pulses. The optical signal may be the same as an emitted optical signal described herein with respect to FIG. 6B.

At step 806, the power monitoring circuit may take a reference measurement by measuring a reference intensity $I_R$ of an incident signal associated with the optical signal. The incident signal may include, for example, stray light and/or a reflection (e.g., off the maintenance area) associated with the optical signal. The power monitoring circuit may determine the reference intensity $I_R$ of the incident signal as described herein (e.g., with respect to FIG. 5). The reference intensity $I_R$ may correspond to or represent an intensity of the emitted optical signal. For example, the reference intensity $I_R$ may be directly proportional to the intensity of the emitted optical signal.

At step 810, the lidar device may aim, direct, or point the transmitter toward a configured position (e.g., angular position) in the scanning area. As described herein, the configured position may be defined in terms of an angular position within the scanning area. As indicated by loop header 808, multiple configured positions (e.g., all configured positions with the scanning area) may be used for the method 800.

At step 812, the transmitter may emit an optical signal toward the configured position, using a power level corresponding to a current operating mode. The optical signal may be the same as the optical signal emitted in step 804 (e.g., same power, intensity, and/or duration). In some cases, when a blockage is present at a window of the lidar device, the emitted optical signal or portion thereof may strike the blockage and reflect back into the device.

At step 814, the power monitoring circuit may measure an intensity $I_S$ of an incident signal associated with the optical signal. The incident signal may include, for example, stray light and/or a reflection (e.g., off the blockage) associated with the optical signal. The power monitoring circuit may determine the intensity $I_S$ of the incident signal as described herein (e.g., with respect to FIG. 5). The intensity $I_S$ may correspond to or represent an intensity of the emitted optical signal and/or the reflection off the blockage.

At step 816, a ratio between the reference intensity $I_R$ and the intensity $I_S$ may be determined (e.g., $I_S/I_R$). Additionally or alternatively, a difference between the reference intensity $I_R$ and the intensity $I_S$ may be determined (e.g., $I_S-I_R$).

At step 818, the determined ratio and/or difference (from step 816) may be compared with a threshold value (e.g., a threshold ratio and/or a threshold difference). For example, when the determined ratio (or difference) is greater than (or equal to) the threshold value, the lidar system may determine that a blockage is present at the configured position. Alternatively, when the determined ratio is less than (or equal to) the threshold value, the lidar system may determine that a blockage is not present at the configured position. For $I_S/I_R$, the threshold value may be, for example from about 1.1 to about 1.5. For $I_S-I_R$, the threshold value may be, for example, from about 10 percent to about 50 percent of $I_R$ (e.g., from about $0.1*I_R$ to about $0.5*I_R$).

In various examples, the method 800 can be performed using the lidar device and/or one or more computer modules or associated computer processors. For example, to perform the method 800, the lidar device may communicate with a detection module (e.g., a program resident in a computer-readable storage medium within the lidar device and executed by a processor within the lidar device) and/or with a control and data acquisition module (e.g., control and data acquisition module 108). The module(s) and/or processor(s) can control the lidar device when performing the method 800, including steps 810-818.

In some examples, blockage detection can be performed based on repeated measurements of intensity $I_S$ (from steps 810-814) and without obtaining measurements of the reference intensity $I_R$. For example, when a sudden increase in intensity $I_S$ occurs (e.g., based on a comparison of two consecutive measurements), the lidar system may conclude that a blockage has appeared on the window of the lidar device. Such measurements of intensity $I_S$ can be performed by the power monitoring circuit at periodic intervals (e.g., separated by one second, one minute, or one hour).

Some Examples of Continuous Wave (CW) Lidar Systems

As discussed above, some lidar systems may use a continuous wave (CW) laser to detect the range and/or velocity of targets, rather than pulsed TOF techniques. Such systems include continuous wave (CW) coherent lidar systems and frequency modulated continuous wave (FMCW) coherent lidar systems. For example, any of the lidar systems 100, 202, 250, and 270 described above can be configured to operate as a CW coherent lidar system or an FMCW coherent lidar system.

Lidar systems configured to operate as CW or FMCW systems can avoid the eye safety hazards commonly associated with pulsed lidar systems (e.g., hazards that arise from transmitting optical signals with high peak power). In addition, coherent detection may be more sensitive than direct detection and can offer better performance, including single-pulse velocity measurement and immunity to interference from solar glare and other light sources, including other lidar systems and devices.

Figure 9:
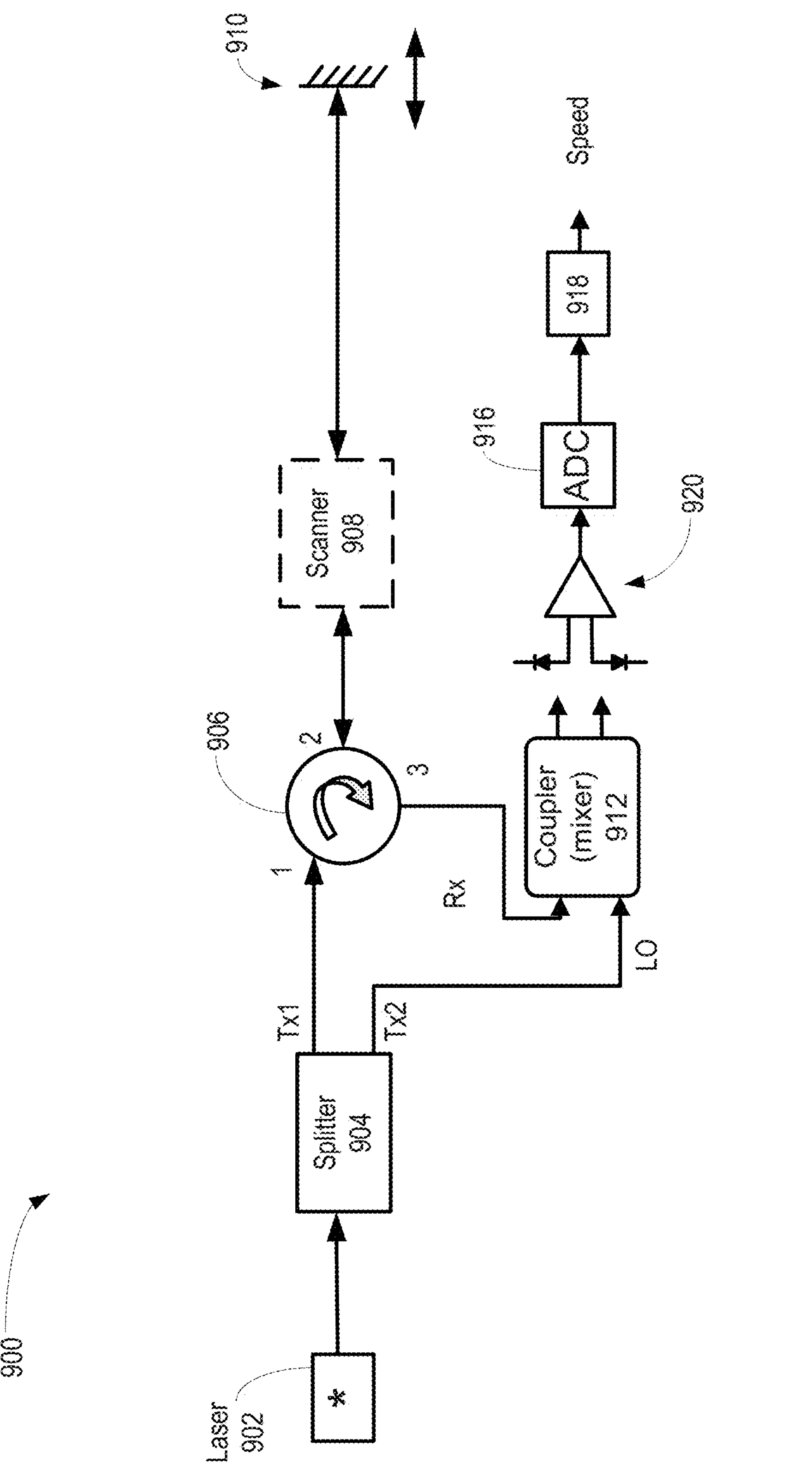
FIG. 9 is an illustration of an example continuous wave (CW) coherent lidar system, in accordance with some embodiments.

FIG. 9 illustrates an exemplary CW coherent lidar system 900 configured to determine the radial velocity (or speed) of a target. Lidar system 900 includes a laser 902 configured to produce a laser signal which is provided to a splitter 904.

The laser 902 may provide a laser signal having a substantially constant laser frequency.

In one example, the splitter 904 provides a first split laser signal Tx1 to a direction selective device 906, which provides (e.g., forwards) the signal Tx1 to a scanner 908. In some examples, the direction selective device 906 is a circulator. The scanner 908 uses the first laser signal Tx1 to transmit light emitted by the laser 902 and receives light reflected by the target 910 (e.g., "reflected light" or "reflections"). The reflected light signal Rx is provided (e.g., passed back) to the direction selective device 906. The second laser signal Tx2 (provided by the splitter 904) and the reflected light signal Rx are provided to a coupler (also referred to as a mixer) 912. The mixer may use the second laser signal Tx2 as a local oscillator (LO) signal and mix it with the reflected light signal Rx. The mixer 912 may be configured to mix the reflected light signal Rx with the local oscillator signal LO. The mixer 912 may provide the mixed optical signal to differential photodetector 914, which may generate an electrical signal representing the beat frequency $f_{beat}$ of the mixed optical signals, where $f_{beat}=|f_{Tx2}-f_{Rx}|$ (the absolute value of the difference between the frequencies of the mixed optical signals). In some embodiments, the current produced by the differential photodetector 914 based on the mixed light may have the same frequency as the beat frequency $f_{beat}$. The current may be converted to a voltage by an amplifier (e.g., a transimpedance amplifier (TIA)), which may be provided (e.g., fed) to an analog-to-digital converter (ADC) 916 configured to convert the analog voltage signal to digital samples for a target detection module 918. The target detection module 918 may be configured to determine (e.g., calculate) the radial velocity of the target 910 based on the digital sampled signal with the beat frequency $f_{beat}$.

In one example, the target detection module 918 may identify Doppler frequency shifts using the beat frequency $f_{beat}$ and determine the radial velocity of the target 910 based on those shifts. For example, the radial velocity of the target 910 can be calculated using the following relationship:

$$f_d = \frac{2}{\lambda} v_t$$

where, $f_d$ is the Doppler frequency shift, A is the wavelength of the laser signal, and $v_t$ is the radial velocity of the target 910. In some examples, the direction of the target 910 is indicated by the sign of the Doppler frequency shift fa. For example, a positive signed Doppler frequency shift may indicate that the target 910 is traveling towards the system 900 and a negative signed Doppler frequency shift may indicate that the target 910 is traveling away from the system 900.

In one example, a Fourier Transform calculation is performed using the digital samples from the ADC 916 to recover the desired frequency content (e.g., the Doppler frequency shift) from the digital sampled signal. For example, a controller (e.g., target detection module 918) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the lidar system 900 is described above as being configured to determine the radial velocity of a target, it should be appreciated that the system can be configured to determine the range and/or radial velocity of a target. For example, the lidar system 900 can be modified to use laser chirps to detect the velocity and/or range of a target.

Some examples have been described in which a DFT is used to generate points of a point cloud based on a group of samples. However, frequency analysis techniques (e.g., spectrum analysis techniques) other than the DFT may be used to generate points of a point cloud based on a group of samples. Any suitable frequency analysis technique may be used, including, without limitation, Discrete Cosine transform (DCT), Wavelet transform, Auto-Regressive moving average (ARMA), etc.

Figure 10:
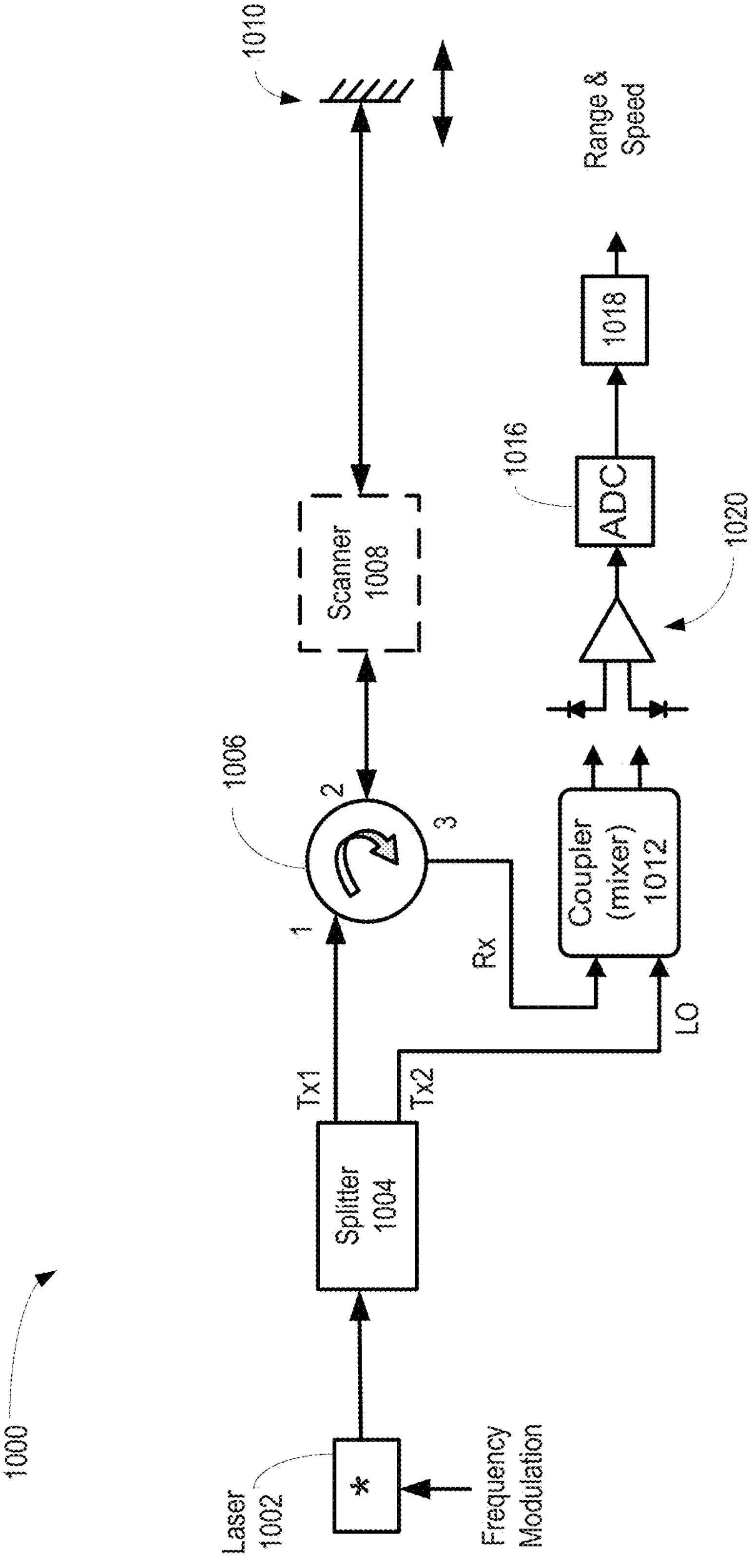
FIG. 10 is an illustration of an example frequency modulated continuous wave (FMCW) coherent lidar system, in accordance with some embodiments.

FIG. 10 illustrates an exemplary FMCW coherent lidar system 1000 configured to determine the range and/or radial velocity of a target. Lidar system 1000 includes a laser 1002 configured to produce a laser signal which is fed into a splitter 1004. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 1002; however, in other examples, an external modulator can be placed between the laser source 1002 and the splitter 1004.

In other examples, the laser frequency can be "chirped" by modulating the phase of the laser signal (or light) produced by the laser 1002. In one example, the phase of the laser signal is modulated using an external modulator placed between the laser source 1002 and the splitter 1004; however, in some examples, the laser source 1002 may be modulated directly by changing operating parameters (e.g., current/voltage) or may include an internal modulator. Similar to frequency chirping, the phase of the laser signal can be increased ("ramped up") or decreased ("ramped down") over time.

Some examples of systems with FMCW-based lidar sensors have been described. However, some embodiments of the techniques described herein may be implemented using any suitable type of lidar sensors including, without limitation, any suitable type of coherent lidar sensors (e.g., phase-modulated coherent lidar sensors). With phase-modulated coherent lidar sensors, rather than chirping the frequency of the light produced by the laser (as described above with reference to FMCW techniques), the lidar system may use a phase modulator placed between the laser 1002 and the splitter 1004 to generate a discrete phase modulated signal, which may be used to measure range and radial velocity.

As shown, the splitter 1004 provides a first split laser signal Tx1 to a direction selective device 1006, which provides (e.g., forwards) the signal Tx1 to a scanner 1008. The scanner 1008 uses the first laser signal Tx1 to transmit light emitted by the laser 1002 and receives light reflected by the target 1010. The reflected light signal Rx is provided (e.g., passed back) to the direction selective device 1006. The second laser signal Tx2 and reflected light signal Rx are provided to a coupler (also referred to as a mixer) 1012. The mixer may use the second laser signal Tx2 as a local oscillator (LO) signal and mix it with the reflected light signal Rx. The mixer 1012 may be configured to mix the reflected light signal Rx with the local oscillator signal LO to generate a beat frequency $f_{beat}$. The mixed signal with beat frequency $f_{beat}$ may be provided to a differential photodetector 1014 configured to produce a current based on the received light. The current may be converted to voltage by an amplifier (e.g., a transimpedance amplifier (TIA)), which may be provided (e.g., fed) to an analog-to-digital converter (ADC) 1016 configured to convert the analog voltage to digital samples for a target detection module 1018. The target detection module 1018 may be configured to determine (e.g., calculate) the range and/or radial velocity of the target 1010 based on the digital sample signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution: } \Delta R = \frac{c}{2BW} \text{ (given a perfectly linear chirp), and}$$

$$\text{Range: } R = \frac{f_{beat} c T_{ChirpRamp}}{2BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent lidar systems may rely on two measurements having different slopes (e.g., negative and positive slopes) to remove this ambiguity. The two measurements having different slopes may also be used to determine range and velocity measurements simultaneously.

Figures 11A, 11B:
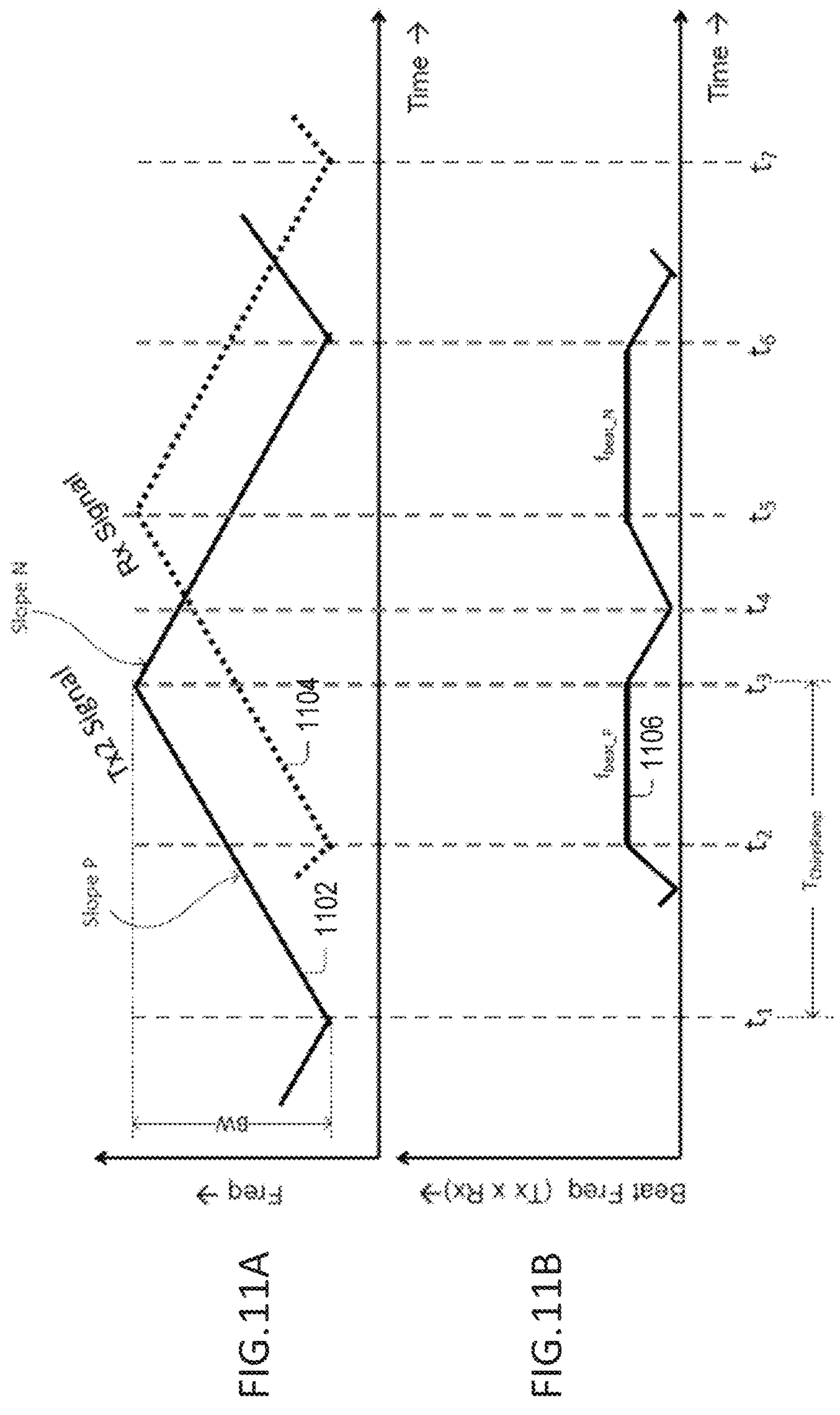
FIG. 11A is a plot of a frequency chirp as a function of time in a transmitted laser signal and reflected signal, in accordance with some embodiments.
FIG. 11B is a plot illustrating a beat frequency of a mixed signal, in accordance with some embodiments.

FIG. 11A is a plot of ideal (or desired) frequency chirp as a function of time in the transmitted laser signal Tx (e.g., signal Tx2), depicted in solid line 1102, and reflected light signal Rx, depicted in dotted line 1104. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 11B is a plot illustrating the corresponding ideal beat frequency $f_{beat}$ 1106 of the mixed signal Tx2×Rx. Note that the beat frequency $f_{beat}$ 1106 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 11A-11B, when the positive and negative ramp pair is used to measure range and velocity simultaneously, the following relationships are utilized:

$$\text{Range: } R = \frac{cT_{ChirpRamp}\frac{(f_{beat\_P} + f_{beat\_N})}{2}}{2BW}, \text{ and}$$

$$\text{Velocity: } V = \frac{\lambda\frac{(f_{beat\_P} - f_{beat\_N})}{2}}{2}$$

where $f_{beat\_p}$ and $f_{beat\_N}$ are beat frequencies generated during positive (P) and negative (N) slopes of the chirp 1102 respectively and λ is the wavelength of the laser signal.

In one example, the scanner 1008 of the lidar system 1000 is used to scan the environment and generate a target point cloud from the acquired scan data. In some examples, the lidar system 1000 can use processing methods that include performing one or more Fourier Transform calculations, such as a Fast Fourier Transform (FFT) or a Discrete Fourier Transform (DFT), to generate the target point cloud from the acquired scan data. Being that the system 1000 is capable of measuring range, each point in the point cloud may have a three-dimensional location (e.g., x, y, and z) in addition to radial velocity. In some examples, the x-y location of each target point corresponds to a radial position of the target point relative to the scanner 1008. Likewise, the z location of each target point corresponds to the distance between the target point and the scanner 1008 (e.g., the range). In one example, each target point corresponds to one frequency chirp 1102 in the laser signal. For example, the samples collected by the system 1000 during the chirp 1102 (e.g., t1 to t6) can be processed to generate one point in the point cloud.

Additional Embodiments, Computing Devices, and Information Handling Systems

Figure 12:
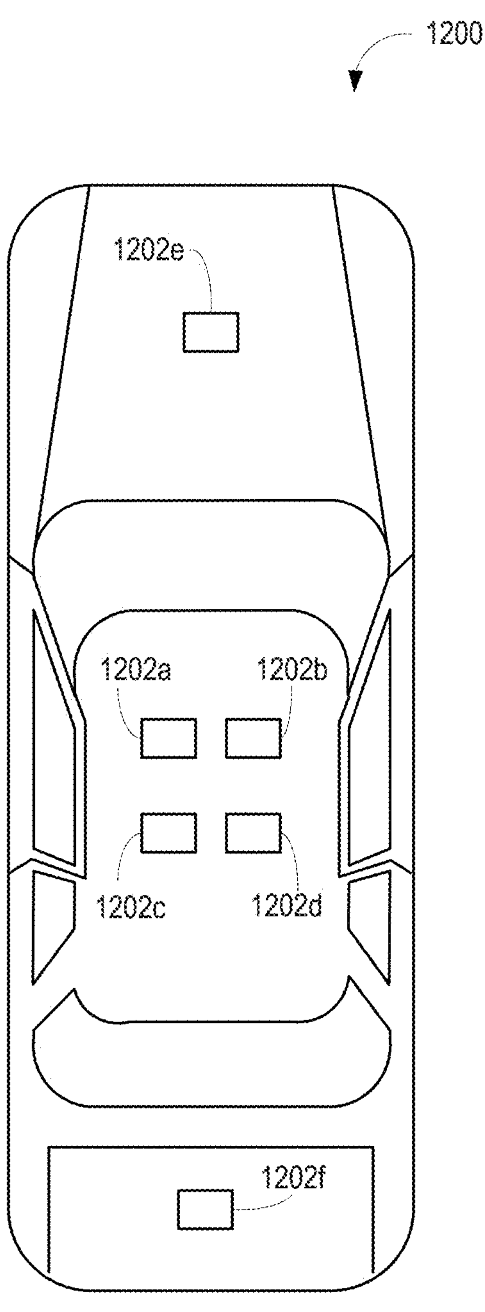
FIG. 12 is a diagram of a vehicle including a plurality of sensors, in accordance with some embodiments.

In some embodiments, lidar systems and techniques described herein may be used to provide mapping and/or autonomous navigation for a vehicle. FIG. 12 illustrates a vehicle 1200 having a plurality of sensors 1202. As shown, a first sensor 1202*a*, a second sensor 1202*b*, a third sensor 1202*c*, and a fourth sensor 1202*d* may be positioned in a first location on (or inside) the vehicle 1200 (e.g., the roof). Likewise, a fifth sensor 1202*e* may be positioned in a second location on (or inside) the vehicle 1200 (e.g., the front of the vehicle 1200) and a sixth sensor 1202*f* may be positioned in a third location on (or inside) the vehicle 1200 (e.g., the back of the vehicle 1200). In other examples, a different number or configuration of sensors may be used.

In some examples, at least one sensor of the plurality of sensors 1202 is configured to provide (or enable) 3D mapping of the vehicle's surroundings. In certain examples, at least one sensor of the plurality of sensors 1202 is used to provide autonomous navigation for the vehicle 1200 within an environment. In one example, each sensor 1202 includes at least one lidar system, device, or chip. The lidar system(s) included in each sensor 1202 may include any of the lidar systems disclosed herein. In some examples, at least one sensor of the plurality of sensors 1202 may be a different type of sensor (e.g., camera, radar, etc.). In one example, the vehicle 1200 is a car; however, in other examples, the vehicle 1200 may be a truck, boat, plane, drone, vacuum cleaner (e.g., robot vacuum cleaner), robot, train, tractor, ATV, or any other type of vehicle or moveable object.

In some embodiments, lidar systems and techniques described herein may be implemented using Silicon photonics (SiP) technologies. SiP is a material platform from which photonic integrated circuits (PICs) can be produced. SiP is compatible with CMOS (electronic) fabrication techniques, which allows PICs to be manufactured using established foundry infrastructure. In PICs, light propagates through a patterned silicon optical medium that lies on top of an insulating material layer (e.g., silicon on insulator (SOI)). In some cases, direct bandgap materials (e.g., indium phosphide (InP)) are used to create light (e.g., laser) sources that are integrated in an SiP chip (or wafer) to drive optical or photonic components within a photonic circuit. SiP technologies are increasingly used in optical datacom, sensing, biomedical, automotive, astronomy, aerospace, augmented reality (AR) applications, virtual reality (VR) applications, artificial intelligence (AI) applications, navigation, image identification, drones, robotics, etc.

Figure 13:
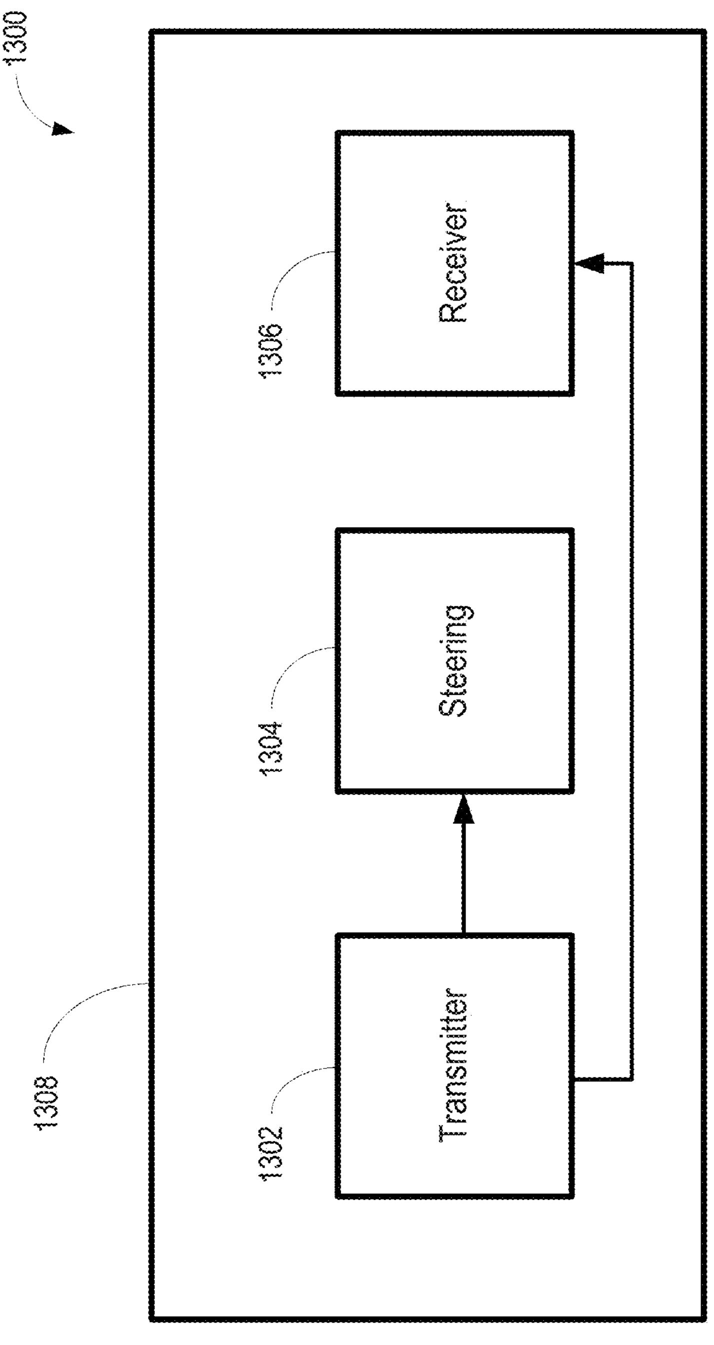
FIG. 13 is a block diagram of a silicon photonic integrated circuit (PIC) in accordance with some embodiments.

FIG. 13 is a block diagram of a silicon photonic integrated circuit (PIC) 1300 in accordance with aspects described herein. In one example, the lidar systems described herein can be implemented as the PIC 1300. The PIC 1300 includes a transmitter module 1302, a steering module 1304, and a receiver module 1306. As shown, the transmitter module 1302, the steering module 1304, and the receiver module 1306 are integrated on a silicon substrate 1308. In other examples, the transmitter module 1302, the steering module 1304, or the receiver module 1306 may be included on a separate substrate. In some embodiments, the steering module 1304 is used by the PIC 1300 in connection with transmission (e.g., emission) and reception (e.g., collection) of optical signals. In some examples, the silicon substrate 1308 is an SOI substrate with a silicon layer (e.g., between 200 nm and 10 micron thick) disposed over an oxide layer (e.g., approximately 2 micron thick). In certain examples, the silicon substrate 1308 can include multiple silicon and/or oxide layers.

In one example, the transmitter module 1302 includes at least one laser source. In some examples, the laser source(s) are implemented using a direct bandgap material (e.g., InP) and integrated on the silicon substrate 1308 via hybrid integration. The transmitter module 1302 may also include at least one splitter, a combiner, and/or a direction selective device that are implemented on the silicon substrate 1308 via monolithic or hybrid integration. In some examples, the laser source(s) are external to the PIC 1300 and the laser signal(s) can be provided to the transmission module 1302.

In some embodiments, lidar systems and techniques described herein may be implemented using micro-electro-mechanical system (MEMS) devices. A MEMS device is a miniature device that has both mechanical and electronic components. The physical dimension of a MEMS device can range from several millimeters to less than one micrometer. Lidar systems may include one or more scanning mirrors implemented as a MEMS mirror (or an array of MEMS mirrors). Each MEMS mirror may be a single-axis MEMS mirror or dual-axis MEMS mirror. The MEMS mirror(s) may be electromagnetic mirrors. A control signal is provided to adjust the position of the mirror to direct light in at least one scan direction (e.g., horizontal and/or vertical). The MEMS mirror(s) can be positioned to steer light transmitted by the lidar system and/or to steer light received by the lidar system. MEMS mirrors are compact and may allow for smaller form-factor lidar systems, faster control speeds, and more precise light steering compared to other mechanical-scanning lidar methods. MEMS mirrors may be used in solid-state (e.g., stationary) lidar systems and rotating lidar systems.

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), network storage device, or any other suitable device and may vary in size, shape, performance, functionality, and price.

Figure 14:
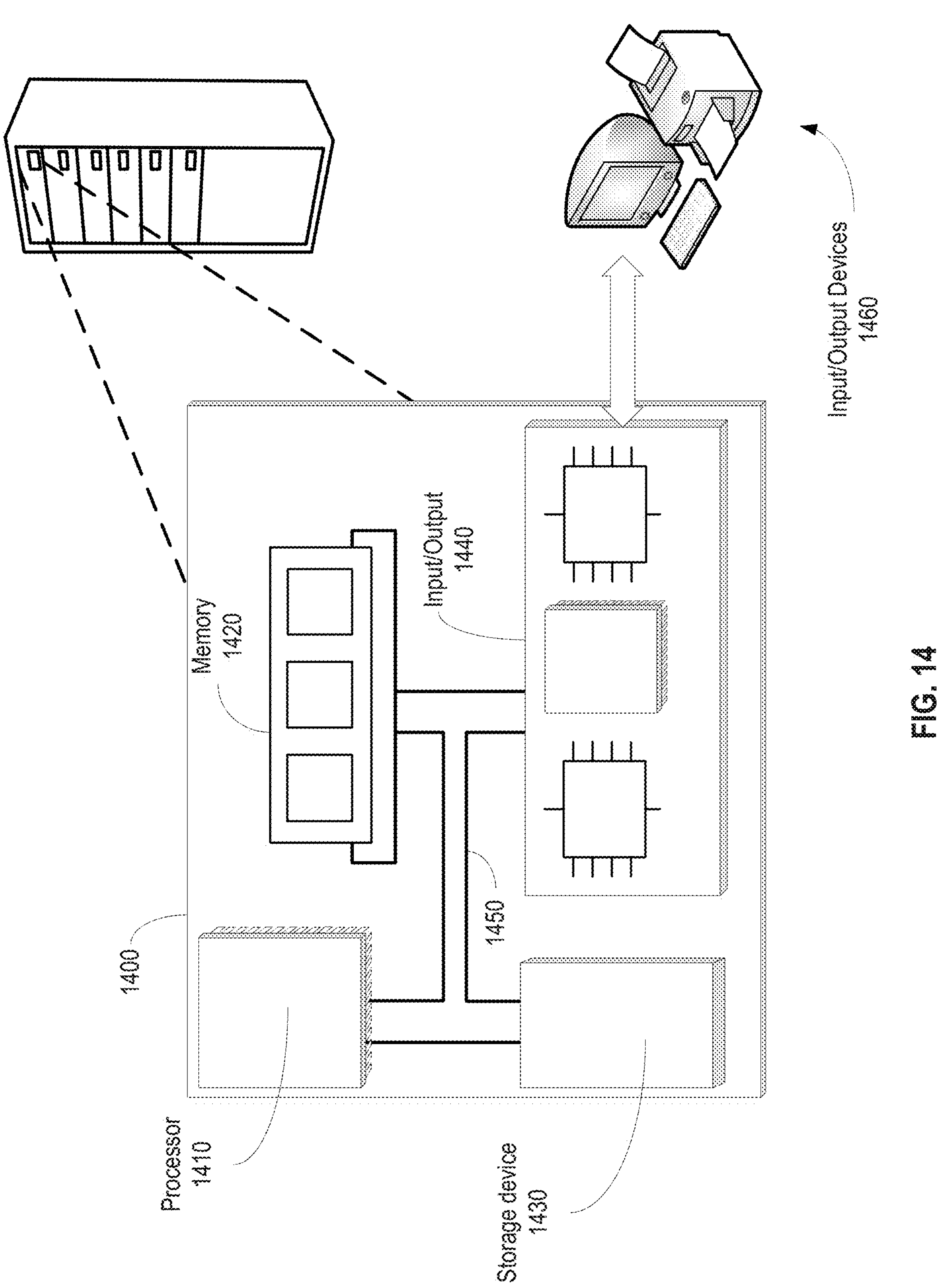
FIG. 14 is a block diagram of an example computer system, in accordance with some embodiments.

FIG. 14 is a block diagram of an example computer system 1400 that may be used in implementing the technology described in this document. General-purpose computers, network appliances, mobile devices, or other electronic systems may also include at least portions of the system 1400. The system 1400 includes a processor 1410, a memory 1420, a storage device 1430, and an input/output device 1440. Each of the components 1410, 1420, 1430, and 1440 may be interconnected, for example, using a system bus 1450. The processor 1410 is capable of processing instructions for execution within the system 1400. In some implementations, the processor 1410 is a single-threaded processor. In some implementations, the processor 1410 is a multi-threaded processor. In some implementations, the processor 1410 is a programmable (or reprogrammable) general purpose microprocessor or microcontroller. The processor 1410 is capable of processing instructions stored in the memory 1420 or on the storage device 1430.

The memory 1420 stores information within the system 1400. In some implementations, the memory 1420 is a non-transitory computer-readable medium. In some implementations, the memory 1420 is a volatile memory unit. In some implementations, the memory 1420 is a non-volatile memory unit.

The storage device 1430 is capable of providing mass storage for the system 1400. In some implementations, the storage device 1430 is a non-transitory computer-readable medium. In various different implementations, the storage device 1430 may include, for example, a hard disk device, an optical disk device, a solid-date drive, a flash drive, or some other large capacity storage device. For example, the storage device may store long-term data (e.g., database data, file system data, etc.). The input/output device 1440 provides input/output operations for the system 1400. In some implementations, the input/output device 1440 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1430 may be implemented in a distributed way over a network, for example as a server farm or a set of widely distributed servers, or may be implemented in a single computing device.

Although an example processing system has been described in FIG. 14, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 15:
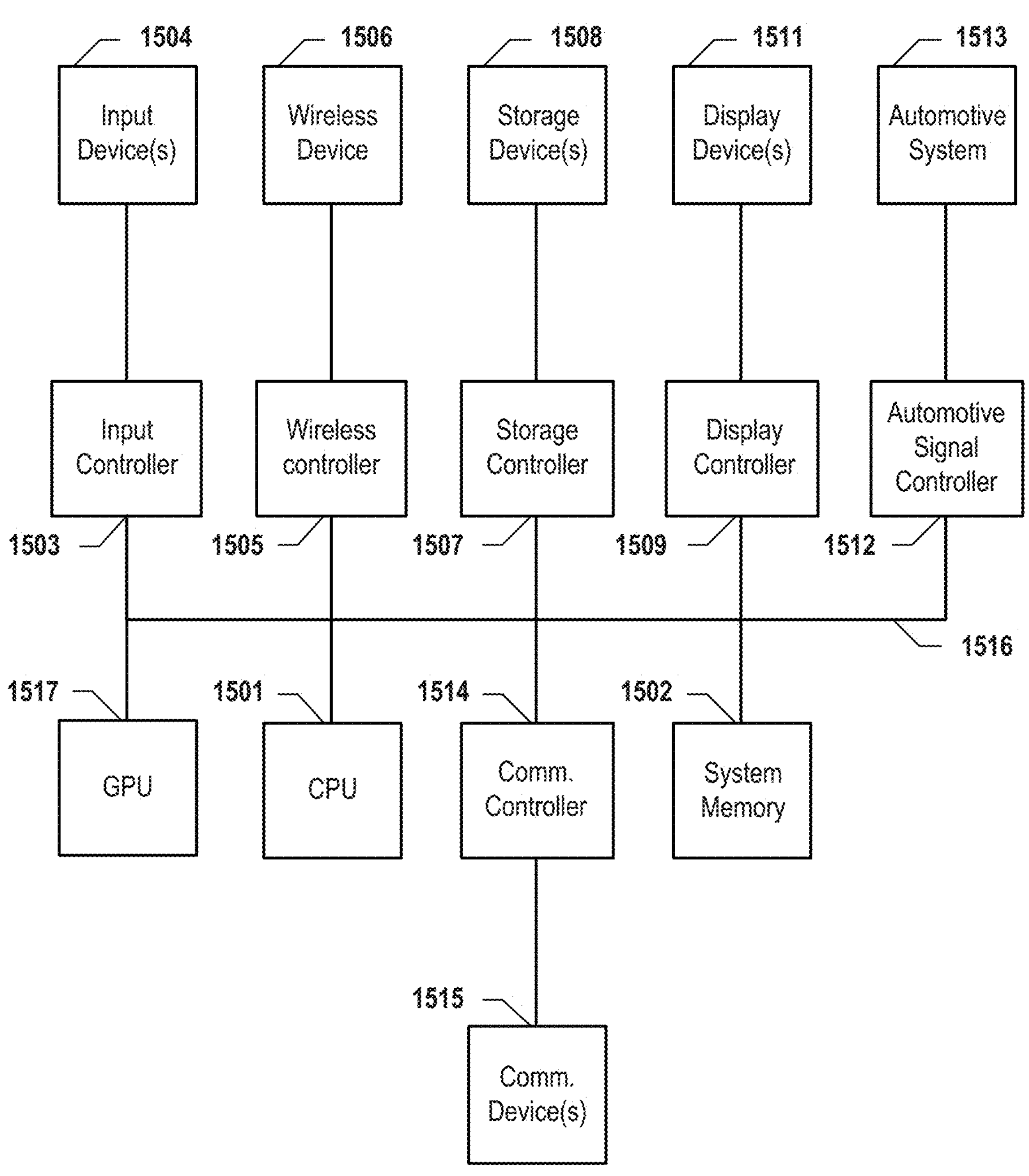
FIG. 15 is a block diagram of a computing device/information handling system, in accordance with some embodiments.

FIG. 15 depicts a simplified block diagram of a computing device/information handling system (or computing system) according to embodiments of the present disclosure. It will be understood that the functionalities shown for system 1500 may operate to support various embodiments of an information handling system—although it shall be understood that an information handling system may be differently configured and include different components.

As illustrated in FIG. 15, system 1500 includes one or more central processing units (CPU) 1501 that provide(s) computing resources and control(s) the computer. CPU 1501 may be implemented with a microprocessor or the like, and may also include one or more graphics processing units (GPU) 1517 and/or a floating point coprocessor for mathematical computations. System 1500 may also include a system memory 1502, which may be in the form of random-access memory (RAM), read-only memory (ROM), or both.

A number of controllers and peripheral devices may also be provided. For example, an input controller 1503 represents an interface to various input device(s) 1504, such as a keyboard, mouse, or stylus. There may also be a wireless controller 1505, which communicates with a wireless device 1506. System 1500 may also include a storage controller 1507 for interfacing with one or more storage devices 1508, each of which includes a storage medium such as a magnetic tape or disk, or an optical medium that might be used to record programs of instructions for operating systems, utilities, and applications, which may include embodiments of programs that implement various aspects of the techniques described herein. Storage device(s) 1508 may also be used to store processed data or data to be processed in accordance with some embodiments. System 1500 may also include a display controller 1509 for providing an interface to a display device 1511, which may be a cathode ray tube (CRT), a thin film transistor (TFT) display, or other type of display. The computing system 1500 may also include an automotive signal controller 1512 for communicating with an automotive system 1513. A communications controller 1514 may interface with one or more communication devices 1515, which enables system 1500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into submodules or combined together.

In embodiments, aspects of the techniques described herein (e.g., timing the emission of optical signals, processing received return signals, generating point clouds, performing one or more (e.g., all) of the steps of the methods described herein, etc.) may be implemented using machine learning and/or artificial intelligence technologies.

"Machine learning" generally refers to the application of certain techniques (e.g., pattern recognition and/or statistical inference techniques) by computer systems to perform specific tasks. Machine learning techniques may be used to build models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. A value of a feature may be a measurement of the corresponding property of an entity or an instance of information regarding an entity. Features can also have data types. For instance, a feature can have an image data type, a numerical data type, a text data type (e.g., a structured text data type or an unstructured ("free") text data type), a categorical data type, or any other suitable data type. In general, a feature's data type is categorical if the set of values that can be assigned to the feature is finite.

As used herein, "model" may refer to any suitable model artifact generated by the process of using a machine learning algorithm to fit a model to a specific training data set. The terms "model," "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

"Artificial intelligence" (AI) generally encompasses any technology that demonstrates intelligence. Applications (e.g., machine-executed software) that demonstrate intelligence may be referred to herein as "artificial intelligence applications," "AI applications," or "intelligent agents." An intelligent agent may demonstrate intelligence, for example, by perceiving its environment, learning, and/or solving problems (e.g., taking actions or making decisions that increase the likelihood of achieving a defined goal). In many cases, intelligent agents are developed by organizations and deployed on network-connected computer systems so users within the organization can access them. Intelligent agents are used to guide decision-making and/or to control systems in a wide variety of fields and industries, e.g., security; transportation; risk assessment and management; supply chain logistics; and energy management. Intelligent agents may include or use models.

Some non-limiting examples of AI application types may include inference applications, comparison applications, and optimizer applications. Inference applications may include any intelligent agents that generate inferences (e.g., predictions, forecasts, etc.) about the values of one or more output variables based on the values of one or more input variables. In some examples, an inference application may provide a recommendation based on a generated inference. For example, an inference application for a lending organization may infer the likelihood that a loan applicant will default on repayment of a loan for a requested amount, and may recommend whether to approve a loan for the requested amount based on that inference. Comparison applications may include any intelligent agents that compare two or more possible scenarios. Each scenario may correspond to a set of potential values of one or more input variables over a period of time. For each scenario, an intelligent agent may generate one or more inferences (e.g., with respect to the values of one or more output variables) and/or recommendations. For example, a comparison application for a lending organization may display the organization's predicted revenue over a period of time if the organization approves loan applications if and only if the predicted risk of default is less than 20% (scenario #1), less than 10% (scenario #2), or less than 5% (scenario #3). Optimizer applications may include any intelligent agents that infer the optimum values of one or more variables of interest based on the values of one or more input variables. For example, an optimizer application for a lending organization may indicate the maximum loan amount that the organization would approve for a particular customer.

As used herein, "data analytics" may refer to the process of analyzing data (e.g., using machine learning models, artificial intelligence, models, or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

Data analytics tools are used to guide decision-making and/or to control systems in a wide variety of fields and industries, e.g., security; transportation; risk assessment and management; supply chain logistics; and energy management. The processes used to develop data analytics tools suitable for carrying out specific data analytics tasks generally include steps of data collection, data preparation, feature engineering, model generation, and/or model deployment.

As used herein, "spatial data" may refer to data relating to the location, shape, and/or geometry of one or more spatial objects. Data collected by lidar systems, devices, and chips described herein may be considered spatial data. A "spatial object" may be an entity or thing that occupies space and/or has a location in a physical or virtual environment. In some cases, a spatial object may be represented by an image (e.g., photograph, rendering, etc.) of the object. In some cases, a spatial object may be represented by one or more geometric elements (e.g., points, lines, curves, and/or polygons), which may have locations within an environment (e.g., coordinates within a coordinate space corresponding to the environment). In some cases, a spatial object may be represented as a cluster of points in a 3D point-cloud.

As used herein, "spatial attribute" may refer to an attribute of a spatial object that relates to the object's location, shape, or geometry. Spatial objects or observations may also have "non-spatial attributes." For example, a residential lot is a spatial object that that can have spatial attributes (e.g., location, dimensions, etc.) and non-spatial attributes (e.g., market value, owner of record, tax assessment, etc.). As used herein, "spatial feature" may refer to a feature that is based on (e.g., represents or depends on) a spatial attribute of a spatial object or a spatial relationship between or among spatial objects. As a special case, "location feature" may refer to a spatial feature that is based on a location of a spatial object. As used herein, "spatial observation" may refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

"Computer vision" generally refers to the use of computer systems to analyze and interpret image data. In some embodiments, computer vision may be used to analyze and interpret data collected by lidar systems (e.g., point-clouds). Computer vision tools generally use models that incorporate principles of geometry and/or physics. Such models may be trained to solve specific problems within the computer vision domain using machine learning techniques. For example, computer vision models may be trained to perform object recognition (recognizing instances of objects or object classes in images), identification (identifying an individual instance of an object in an image), detection (detecting specific types of objects or events in images), etc.

Computer vision tools (e.g., models, systems, etc.) may perform one or more of the following functions: image pre-processing, feature extraction, and detection/segmentation. Some examples of image pre-processing techniques include, without limitation, image re-sampling, noise reduction, contrast enhancement, and scaling (e.g., generating a scale space representation). Extracted features may be low-level (e.g., raw pixels, pixel intensities, pixel colors, gradients, patterns and textures (e.g., combinations of colors in close proximity), color histograms, motion vectors, edges, lines, corners, ridges, etc.), mid-level (e.g., shapes, surfaces, volumes, patterns, etc.), or high-level (e.g., objects, scenes, events, etc.). The detection/segmentation function may involve selection of a subset of the input image data (e.g., one or more images within a set of images, one or more regions within an image, etc.) for further processing.

Some Embodiments

Some embodiments may include any of the following:

A1. A lidar power monitoring method comprising: emitting, by a transmitter of a lidar device, an optical signal toward a maintenance area that is inside the lidar device and outside a field of view for the lidar device; measuring, by a power monitoring circuit of the lidar device, an intensity of an incident signal corresponding to the optical signal; comparing the measured intensity with a target intensity value; and adjusting, based on the comparison, an electrical control signal provided to the transmitter.

A2. The method of clause A1, wherein the power monitoring circuit comprises: a photodiode coupled to a voltage bias; an amplifier stage coupled to the photodiode; an integrator stage coupled to the amplifier stage; and a converter coupled to the integrator stage.

A3. The method of clause A2, wherein the photodiode is configured to: measure the intensity of the incident signal based on a conversion of the incident signal to an electrical signal.

A4. The method of clause A2 or A3, wherein the amplifier stage is configured to: receive an electrical signal from the photodiode; amplify the electrical signal by a first gain or a second gain based on a power level corresponding to an operating mode of the transmitter; and provide the amplified electrical signal to the integrator stage.

A5. The method of any of clauses A2 to A4, wherein the integrator stage is configured to: receive an amplified electrical signal from the amplifier stage; store the amplified electrical signal as a voltage across a capacitive load; and discharge the voltage.

A6. The method of any of clauses A2 to A5, wherein the converter comprises an analog to digital converter, and wherein the converter is configured to: sample a voltage provided by the integrator stage; and generate an output based on a magnitude of the voltage, wherein the output is indicative of the measured intensity of the incident signal.

A7. The method of any of clauses A1 to A6, wherein the incident signal comprises one or more of a portion of the optical signal or a portion of a reflection of the optical signal off the maintenance area.

A8. The method of any of clauses A1 to A7, wherein the measured intensity is indicative of an intensity of the optical signal.

A9. The method of any of clauses A1 to A8, wherein measuring the intensity of the incident signal further comprises: converting the incident signal to an electrical signal; amplifying the electrical signal by a first gain or a second gain based on a power level corresponding to an operating mode of the transmitter; storing, based on integrating the amplified electrical signal, a voltage; and generating, based on sampling the voltage, an output indicative of the measured intensity of the incident signal.

A10. The method of any of clauses A1 to A9, wherein adjusting the electrical control signal comprises using at least one of an iterative technique or a process control technique.

A11. The method of any of clauses A1 to A10, further comprising: emitting, by the transmitter, a second optical signal toward a scanning area corresponding to the field of view; measuring, by the power monitoring circuit, an intensity of a second incident signal corresponding to the second optical signal; and determining, based on a comparison of the measured intensity of the incident signal and the measured intensity of the second incident signal, that a blockage is disposed on the window.

A12. A lidar system comprising: a lidar device comprising: a transmitter configured to emit optical signals; a power monitoring circuit configured to monitor intensities associated with the optical signals; a maintenance area located inside the lidar device and outside a field of view for the lidar device; and at least one processor, wherein the transmitter is configured to emit an optical signal toward the maintenance area, wherein the power monitoring circuit is configured to measure an intensity of an incident signal corresponding to the optical signal, and wherein the at least one processor is programmed to perform operations comprising: comparing the measured intensity with a target intensity value, and adjusting, based on the comparison, an electrical control signal provided to the transmitter.

A13. The lidar system of clause A12, wherein the power monitoring circuit comprises: a photodiode coupled to a voltage bias; an amplifier stage coupled to the photodiode; an integrator stage coupled to the amplifier stage; and a converter coupled to the integrator stage.

A14. The lidar system of clause A13, wherein the photodiode is configured to: measure the intensity of the incident signal based on a conversion of the incident signal to an electrical signal.

A15. The lidar system of clause A13 or A14, wherein the amplifier stage is configured to: receive an electrical signal from the photodiode; amplify the electrical signal by a first gain or a second gain based on a power level corresponding to an operating mode of the transmitter; and provide the amplified electrical signal to the integrator stage.

A16. The lidar system of any of clauses A13 to A15, wherein the integrator stage is configured to: receive an amplified electrical signal from the amplifier stage; store the amplified electrical signal as a voltage across a capacitive load; and discharge the voltage.

A17. The lidar system of any of clauses A13 to A16, wherein the converter comprises an analog to digital converter, and wherein the converter is configured to: sample a voltage provided by the integrator stage; and generate an output based on a magnitude of the voltage, wherein the output is indicative of the measured intensity of the incident signal.

A18. The lidar system of any of clauses A12 to A17, wherein the incident signal comprises one or more of a portion of the optical signal or a portion of a reflection of the optical signal off the maintenance area, and wherein the power monitoring circuit is configured to measure the intensity of the incident signal by: converting the incident signal to an electrical signal; amplifying the electrical signal by a first gain or a second gain based on a power level corresponding to an operating mode of the transmitter; storing, based on integrating the amplified electrical signal, a voltage; and generating, based on sampling the voltage, an output indicative of the measured intensity of the incident signal.

A19. The lidar system of any of clauses A12 to A18, wherein adjusting the electrical control signal comprises using at least one of an iterative technique or a process control technique.

A20. The lidar system of any of clauses A12 to A19, wherein the transmitter is configured to emit a second optical signal toward a scanning area corresponding to the field of view, wherein the power monitoring circuit is configured to measure an intensity of a second incident signal corresponding to the second optical signal, and wherein the operations comprise determining, based on a comparison of the measured intensity of the incident signal and the measured intensity of the second incident signal, that a blockage is disposed on the window.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of monitoring lidar power in a lidar device having a plurality of transmitter channels, the method comprising:

in a calibration mode separate from an environmental scanning mode, performing a calibration procedure for each of the plurality of transmitter channels, the calibration procedure comprising, iteratively performing the steps of:

emitting, by the respective transmitter channel, an optical signal toward a maintenance area that is inside the lidar device and outside a field of view for the lidar device;

measuring, by a power monitoring circuit of the lidar device, an intensity of an incident signal corresponding to the optical signal;

and adjusting, based on a comparison of the measured intensity with a target intensity value, an electrical control signal provided to the respective transmitter channel;

until the measured intensity for each of the plurality of transmitter channels converges with the target intensity value to establish a respective calibrated electrical control signal; and subsequently, in the environmental scanning mode, applying the respective calibrated electrical control signal to each of the plurality of transmitter channels for emissions of optical signals toward a scanning area.

2. The method of claim 1, wherein the power monitoring circuit comprises:

a photodiode coupled to a voltage bias;

an amplifier stage coupled to the photodiode;

an integrator stage coupled to the amplifier stage; and a converter coupled to the integrator stage.

3. The method of claim 2, wherein the photodiode is configured to:

measure the intensity of the incident signal based on a conversion of the incident signal to an electrical signal.

4. The method of claim 2, wherein the amplifier stage is configured to:

receive an electrical signal from the photodiode;

amplify the electrical signal by a first gain or a second gain based on a power level corresponding to an operating mode of the transmitter; and provide the amplified electrical signal to the integrator stage.

5. The method of claim 2, wherein the integrator stage is configured to:

receive an amplified electrical signal from the amplifier stage;

store the amplified electrical signal as a voltage across a capacitive load; and discharge the voltage.

6. The method of claim 2, wherein the converter comprises an analog to digital converter, and wherein the converter is configured to:

sample a voltage provided by the integrator stage; and generate an output based on a magnitude of the voltage, wherein the output is indicative of the measured intensity of the incident signal.

7. The method of claim 1, wherein the incident signal comprises one or more of a portion of the optical signal or a portion of a reflection of the optical signal off the maintenance area.

8. The method of claim 1, wherein the measured intensity is indicative of an intensity of the optical signal.

9. The method of claim 1, wherein measuring the intensity of the incident signal further comprises:

converting the incident signal to an electrical signal;

amplifying the electrical signal by a first gain or a second gain based on a power level corresponding to an operating mode of the transmitter;

storing, based on integrating the amplified electrical signal, a voltage; and generating, based on sampling the voltage, an output indicative of the measured intensity of the incident signal.

10. The method of claim 1, wherein adjusting the electrical control signal comprises using at least one of an iterative technique or a process control technique.

11. A lidar power monitoring method comprising:

emitting, by a transmitter of a lidar device, an optical signal toward a maintenance area that is inside the lidar device and outside a field of view for the lidar device;

measuring, by a power monitoring circuit of the lidar device, an intensity of an incident signal corresponding to the optical signal;

comparing the measured intensity with a target intensity value; and adjusting, based on the comparison, an electrical control signal provided to the transmitter;

emitting, by the transmitter, a second optical signal toward a scanning area corresponding to the field of view;

measuring, by the power monitoring circuit, an intensity of a second incident signal corresponding to the second optical signal; and determining, based on a comparison of the measured intensity of the incident signal and the measured intensity of the second incident signal, that a blockage is disposed on the window.

12. A lidar system comprising:

a lidar device comprising:

a plurality of transmitter channels, each configured to emit optical signals;

a power monitoring circuit configured to monitor intensities associated with the optical signals;

a maintenance area located inside the lidar device and outside a field of view for the lidar device; and at least one processor, wherein each transmitter channel is configured, in a calibration mode separate from an environmental scanning mode, to emit an optical signal toward the maintenance area, wherein the power monitoring circuit is configured to measure an intensity of an incident signal corresponding to the optical signal, and wherein the at least one processor is programmed to perform operations comprising:

comparing the measured intensity with a target intensity value, and iteratively adjusting, for each transmitter channel and based on the comparison, an electrical control signal provided to the respective transmitter channel until the measured intensity converges with the target intensity value to establish a respective calibrated electrical control signal; and subsequently, in the environmental scanning mode, applying the respective calibrated electrical control signal to each of the plurality of transmitter channels for emissions of optical signals toward a scanning area.

13. The lidar system of claim 12, wherein the power monitoring circuit comprises:

a photodiode coupled to a voltage bias;

an amplifier stage coupled to the photodiode;

an integrator stage coupled to the amplifier stage; and a converter coupled to the integrator stage.

14. The lidar system of claim 13, wherein the photodiode is configured to:

measure the intensity of the incident signal based on a conversion of the incident signal to an electrical signal.

15. The lidar system of claim 13, wherein the amplifier stage is configured to:

receive an electrical signal from the photodiode;

amplify the electrical signal by a first gain or a second gain based on a power level corresponding to an operating mode of the transmitter; and provide the amplified electrical signal to the integrator stage.

16. The lidar system of claim 13, wherein the integrator stage is configured to:

receive an amplified electrical signal from the amplifier stage;

store the amplified electrical signal as a voltage across a capacitive load; and discharge the voltage.

17. The lidar system of claim 13, wherein the converter comprises an analog to digital converter, and wherein the converter is configured to:

sample a voltage provided by the integrator stage; and generate an output based on a magnitude of the voltage, wherein the output is indicative of the measured intensity of the incident signal.

18. The lidar system of claim 12, wherein the incident signal comprises one or more of a portion of the optical signal or a portion of a reflection of the optical signal off the maintenance area, and wherein the power monitoring circuit is configured to measure the intensity of the incident signal by:

converting the incident signal to an electrical signal;

amplifying the electrical signal by a first gain or a second gain based on a power level corresponding to an operating mode of the transmitter;

storing, based on integrating the amplified electrical signal, a voltage; and generating, based on sampling the voltage, an output indicative of the measured intensity of the incident signal.

19. The lidar system of claim 12, wherein adjusting the electrical control signal comprises using at least one of an iterative technique or a process control technique.

20. A lidar system comprising:

a lidar device comprising:

a transmitter configured to emit optical signals;

a power monitoring circuit configured to monitor intensities associated with the optical signals;

a maintenance area located inside the lidar device and outside a field of view for the lidar device; and at least one processor, wherein the transmitter is configured to emit a first optical signal toward the maintenance area, wherein the power monitoring circuit is configured to measure an intensity of an incident signal corresponding to the first optical signal, and wherein the at least one processor is programmed to perform operations comprising: comparing the measured intensity with a target intensity value, and adjusting, based on the comparison, an electrical control signal provided to the transmitter, and wherein the transmitter is further configured to emit a second optical signal toward a scanning area corresponding to the field of view, wherein the power monitoring circuit is configured to measure an intensity of a second incident signal corresponding to the second optical signal, and wherein the operations comprise determining, based on a comparison of the measured intensity of the incident signal and the measured intensity of the second incident signal, that a blockage is disposed on the window.

* * * * *